(12) United States Patent
Narayanan et al.

(10) Patent No.: US 8,296,671 B2
(45) Date of Patent: Oct. 23, 2012

(54) ENABLING ACCESS TO RICH DATA BY INTERCEPTING PASTE OPERATIONS

(75) Inventors: Raman Narayanan, Kirkland, WA (US); Ming Liu, Redmond, WA (US); Paresh S Suthar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 893 days.

(21) Appl. No.: 12/113,214

(22) Filed: May 1, 2008

(65) Prior Publication Data

US 2009/0276723 A1    Nov. 5, 2009

(51) Int. Cl.
*G06F 3/00* (2006.01)
(52) U.S. Cl. ......... 715/770; 715/764; 715/765; 715/769
(58) Field of Classification Search .................... 715/770
See application file for complete search history.

(56) References Cited

U.S. PATENT DOCUMENTS

| | | |
|---|---|---|
| 5,261,080 A | 11/1993 | Khoyi et al. |
| 5,392,386 A | 2/1995 | Chalas |
| 5,442,742 A | 8/1995 | Greyson et al. |
| 5,579,521 A | 11/1996 | Shearer et al. |
| 5,625,809 A | 4/1997 | Dysart et al. |
| 5,752,254 A | 5/1998 | Sakairi |
| 5,781,192 A | 7/1998 | Kodimer |
| 5,781,908 A | 7/1998 | Williams et al. |
| 5,899,996 A | 5/1999 | Dysart et al. |
| 5,924,099 A | 7/1999 | Guzak et al. |
| 5,926,633 A | 7/1999 | Takagi et al. |
| 5,964,834 A | 10/1999 | Crutcher |
| 5,974,238 A | 10/1999 | Chase, Jr. |
| 6,091,731 A | 7/2000 | Biegaj et al. |
| 6,202,100 B1 | 3/2001 | Maltby et al. |
| 6,295,541 B1 | 9/2001 | Bodnar et al. |
| 6,309,305 B1 | 10/2001 | Kraft |
| 6,338,084 B1 | 1/2002 | Rankin et al. |
| 6,401,104 B1 | 6/2002 | LaRue et al. |
| 6,460,089 B1 | 10/2002 | Romano et al. |

(Continued)

FOREIGN PATENT DOCUMENTS

EP     0597575 B1    12/1999

(Continued)

OTHER PUBLICATIONS

Danny Goodman, "JavaScript Bible," 3 pages provided (Wiley & Sons, Apr. 2007) ("JavaScript").*

(Continued)

*Primary Examiner* — Doug Hutton, Jr.
*Assistant Examiner* — Scott M Kelly
(74) *Attorney, Agent, or Firm* — Microsoft Corporation

(57) ABSTRACT

Systems and methods for enabling access to data, including data represented using a variety of "richer" data formats, are disclosed. Such systems and methods may be useful, among a variety of cases, with applications or entities that may not typically be able to access such richer data. In at least some implementations, data copied to a clipboard and formatted using a variety of formats may be provided or accessed by a destination application as part of a paste operation even when the destination application may not natively provide the ability to access all of the data formats that might exist on a clipboard. In at least some implementations, such access may be provided without modifying or augmenting the data placed on the clipboard.

20 Claims, 4 Drawing Sheets

U.S. PATENT DOCUMENTS

| | | |
|---|---|---|
| 6,490,634 B2 | 12/2002 | Coiner |
| 6,532,474 B2 | 3/2003 | Iwamoto et al. |
| 6,549,922 B1 | 4/2003 | Srivastava et al. |
| 6,553,037 B1 | 4/2003 | Piowar et al. |
| 6,591,295 B1 | 7/2003 | Diamond et al. |
| 6,675,213 B1 | 1/2004 | Schmonsees |
| 6,721,951 B1 | 4/2004 | Williams et al. |
| 6,724,403 B1 | 4/2004 | Santoro et al. |
| 6,760,728 B1 | 7/2004 | Osborn |
| 6,781,192 B2 | 8/2004 | Farrar |
| 6,912,690 B2 | 6/2005 | Bauchot |
| 6,983,328 B2 | 1/2006 | Beged-Dov et al. |
| 6,986,105 B2 | 1/2006 | Walker, Jr. |
| 6,993,522 B2 | 1/2006 | Chen et al. |
| 7,003,546 B1 | 2/2006 | Cheah |
| 7,007,041 B2 | 2/2006 | Multer et al. |
| 7,013,316 B1 | 3/2006 | Hansen et al. |
| 7,130,924 B2 | 10/2006 | Bartlett et al. |
| 7,146,571 B2 | 12/2006 | Bates et al. |
| 7,207,008 B1 | 4/2007 | Koch |
| 7,260,610 B2 | 8/2007 | Grooters et al. |
| 7,293,112 B2 | 11/2007 | Cone et al. |
| 7,395,317 B2 | 7/2008 | Naick et al. |
| 7,421,155 B2 | 9/2008 | King et al. |
| 7,475,390 B2 | 1/2009 | Berstis et al. |
| 7,480,861 B2 | 1/2009 | Yalovsky et al. |
| 7,496,230 B2 | 2/2009 | Chen et al. |
| 7,640,184 B1 | 12/2009 | Lunt |
| 7,725,456 B2 | 5/2010 | Augustine |
| 7,774,753 B1 * | 8/2010 | Reilly et al. .................. 717/120 |
| 7,933,296 B2 | 4/2011 | Augustine et al. |
| 7,950,066 B1 * | 5/2011 | Zuili ............................... 726/33 |
| 8,020,112 B2 | 9/2011 | Ozzie et al. |
| 2002/0007380 A1 | 1/2002 | Bauchot et al. |
| 2002/0073204 A1 | 6/2002 | Dutte et al. |
| 2002/0122054 A1 | 9/2002 | Hind et al. |
| 2002/0133508 A1 | 9/2002 | LaRue et al. |
| 2002/0138653 A1 | 9/2002 | Ogura |
| 2002/0143997 A1 | 10/2002 | Huang et al. |
| 2003/0009602 A1 | 1/2003 | Jacobs et al. |
| 2003/0105831 A1 | 6/2003 | O'Kane |
| 2003/0115301 A1 | 6/2003 | Koskimies |
| 2003/0142134 A1 | 7/2003 | Bates et al. |
| 2003/0149708 A1 | 8/2003 | Tsao |
| 2003/0220966 A1 | 11/2003 | Hepper et al. |
| 2004/0019614 A1 | 1/2004 | Wang |
| 2004/0100496 A1 | 5/2004 | Creasor et al. |
| 2004/0103167 A1 | 5/2004 | Grooters et al. |
| 2004/0148375 A1 | 7/2004 | Levett et al. |
| 2004/0153974 A1 | 8/2004 | Walker |
| 2004/0172423 A1 | 9/2004 | Kaasten et al. |
| 2004/0172584 A1 | 9/2004 | Jones et al. |
| 2004/0205470 A1 | 10/2004 | Jones et al. |
| 2004/0210846 A1 | 10/2004 | Olsen |
| 2004/0226012 A1 | 11/2004 | Awada et al. |
| 2004/0250215 A1 | 12/2004 | Chen et al. |
| 2005/0038811 A1 | 2/2005 | Pivowar et al. |
| 2005/0050054 A1 | 3/2005 | Clark et al. |
| 2005/0066335 A1 | 3/2005 | Aarts |
| 2005/0091603 A1 | 4/2005 | Chen et al. |
| 2005/0102629 A1 | 5/2005 | Chen et al. |
| 2005/0117606 A1 | 6/2005 | Kim |
| 2005/0138122 A1 | 6/2005 | Boehringer et al. |
| 2005/0154994 A1 | 7/2005 | Chen et al. |
| 2005/0155017 A1 | 7/2005 | Berstis et al. |
| 2005/0165615 A1 | 7/2005 | Minar |
| 2005/0172241 A1 * | 8/2005 | Daniels et al. ................ 715/770 |
| 2005/0172296 A1 | 8/2005 | Schleifer et al. |
| 2005/0182792 A1 | 8/2005 | Israel et al. |
| 2005/0198299 A1 | 9/2005 | Beck et al. |
| 2005/0203905 A1 | 9/2005 | Jung et al. |
| 2005/0203908 A1 | 9/2005 | McArdle |
| 2005/0256907 A1 | 11/2005 | Novik et al. |
| 2005/0262521 A1 | 11/2005 | Kesavarapu |
| 2005/0289265 A1 | 12/2005 | Blowsky et al. |
| 2006/0004600 A1 | 1/2006 | Summer et al. |
| 2006/0010204 A1 | 1/2006 | Jatava et al. |
| 2006/0028396 A1 | 2/2006 | Starbuck et al. |
| 2006/0041589 A1 | 2/2006 | Helfman et al. |
| 2006/0041893 A1 | 2/2006 | Castro et al. |
| 2006/0066335 A1 | 3/2006 | Kang et al. |
| 2006/0074996 A1 | 4/2006 | Corbett et al. |
| 2006/0095507 A1 | 5/2006 | Watson |
| 2006/0106879 A1 | 5/2006 | Zondervan et al. |
| 2006/0123010 A1 | 6/2006 | Landry et al. |
| 2006/0129907 A1 | 6/2006 | Volk et al. |
| 2006/0129917 A1 | 6/2006 | Volk et al. |
| 2006/0143459 A1 | 6/2006 | Villaron et al. |
| 2006/0150004 A1 | 7/2006 | Mizutani |
| 2006/0155821 A1 | 7/2006 | Pichetti et al. |
| 2006/0173985 A1 | 8/2006 | Moore et al. |
| 2006/0184617 A1 | 8/2006 | Nicholas et al. |
| 2006/0190835 A1 | 8/2006 | Cunningham et al. |
| 2006/0206807 A1 | 9/2006 | Rosner et al. |
| 2006/0212792 A1 | 9/2006 | White et al. |
| 2006/0215215 A1 | 9/2006 | Kumaran |
| 2006/0217126 A1 | 9/2006 | Sohm et al. |
| 2006/0218224 A1 | 9/2006 | Agrawal et al. |
| 2006/0218492 A1 | 9/2006 | Andrade |
| 2006/0225137 A1 | 10/2006 | Odins-Lucas et al. |
| 2006/0230021 A1 | 10/2006 | Diab et al. |
| 2006/0230345 A1 | 10/2006 | Weng et al. |
| 2006/0242327 A1 | 10/2006 | Knight et al. |
| 2006/0242549 A1 | 10/2006 | Schwier et al. |
| 2006/0247961 A1 | 11/2006 | Klemow |
| 2006/0253489 A1 | 11/2006 | Kahn et al. |
| 2006/0265396 A1 | 11/2006 | Raman et al. |
| 2006/0265409 A1 | 11/2006 | Neumann et al. |
| 2006/0265518 A1 | 11/2006 | Owens et al. |
| 2006/0282822 A1 | 12/2006 | Weng |
| 2006/0288053 A1 | 12/2006 | Holt et al. |
| 2006/0288329 A1 | 12/2006 | Gandhi et al. |
| 2007/0022174 A1 | 1/2007 | Issa |
| 2007/0038712 A1 | 2/2007 | Affronte et al. |
| 2007/0061752 A1 | 3/2007 | Cory |
| 2007/0100959 A1 | 5/2007 | Eichstaedt et al. |
| 2007/0100960 A1 | 5/2007 | Eichstaedt et al. |
| 2007/0106952 A1 | 5/2007 | Matas et al. |
| 2007/0112880 A1 | 5/2007 | Yang et al. |
| 2007/0136443 A1 | 6/2007 | Sah et al. |
| 2007/0162517 A1 | 7/2007 | Teegan et al. |
| 2007/0168461 A1 | 7/2007 | Moore |
| 2007/0204308 A1 | 8/2007 | Nicholas et al. |
| 2007/0250520 A1 | 10/2007 | Dettinger et al. |
| 2007/0276836 A1 | 11/2007 | Chatterjee et al. |
| 2007/0294366 A1 | 12/2007 | Ozzie et al. |
| 2007/0299880 A1 | 12/2007 | Kawabe et al. |
| 2008/0028442 A1 | 1/2008 | Kaza et al. |
| 2008/0046471 A1 | 2/2008 | Moore et al. |
| 2008/0108744 A1 | 5/2008 | Ishige et al. |
| 2008/0109464 A1 | 5/2008 | Ozzie et al. |
| 2008/0109744 A1 * | 5/2008 | Ozzie et al. .................... 715/770 |
| 2008/0109832 A1 | 5/2008 | Ozzie et al. |
| 2008/0126364 A1 | 5/2008 | Khosravy et al. |
| 2008/0141136 A1 | 6/2008 | Ozzie et al. |
| 2008/0144669 A1 | 6/2008 | Lee et al. |
| 2008/0155112 A1 | 6/2008 | Ma et al. |
| 2008/0195739 A1 | 8/2008 | Ozzie et al. |
| 2008/0243874 A1 | 10/2008 | Suthar et al. |
| 2008/0267221 A1 | 10/2008 | Ozzie et al. |

FOREIGN PATENT DOCUMENTS

| | | |
|---|---|---|
| WO | 0073902 A1 | 12/2000 |
| WO | 03030475 A2 | 4/2003 |

OTHER PUBLICATIONS

CodeGuru, "Clipboard copy/paste detection," 17 pages, available at http:www.codeguru.com/forum/showthread.php?t=343977 (posts dated 2005-2007) ("CodeGuru").*

Miller, et al., "Synchronizing Clipboards of Multiple Computers", UIST '99. Asheville, NC. pp. 65-66.

"Clipboard: Adding Other Formats", 2006. Microsoft Corporation. Webpage Available at: http://msdn2.microsoft.com/en-us/library/838a3whf(vs.80,d=printer).aspx, 1 page.

Cheung, et al., "Automatic Device Configuration and Data Validation through Mobile Communication", IEEE, 2003. pp. 284-287.

Stylos, et al., "Citrine: Providing Intelligent Copy-and-Paste", pp. 1 of 4; UIST '04, Oct. 24-27, 2004, Santa Fe, New Mexico, USA. Proceedings of the 17th Annual ACM Symposium on User Interface Software and Technology.

Miller, et al., "Synchronizing Clipboards of Multiple Computers", UIST 1999. Asheville, NC. pp. 65-66.

"Ray Ozzie Clipboard Example", May 14, 2006, retrieved at <<http://microtemplates.org/2006/05/14/ray-ozzie-clipboard-example/>>, pp. 5.

"Live Clipboard", Apr. 21, 2006. Webpage available at http://spaces.live.com/editorial/rayozzie/demo/liveclip/specification/v092.html, 15 pages.

"Live Clipboard Example", Jul. 3, 2008 Webpage Available at: http://spaces.live.com/editorial/rayozzie/demo/liveclip/liveclipsample/clipboardexample.html, 2 pages.

"Live Clipboard Screencasts" Retrieved on Jul. 3, 2008, Webpage Available at: http://spaces.live.com/editorial/rayozzie/demo/liveclip/screencast/liveclipdemo.html, 1 page.

Burcham, "Baby Steps to Synergistic Web Apps" Oct. 21, 2005, Webpage Available at: http://lesscode.org/2005/10/21/baby-steps-to-synergistic-web-apps/,11 pages.

Burcham, "Half a Baby Step" Nov. 2, 2005, Webpage Available at: http://lesscode.org/2005/11/02/half-a-baby-step/, 4 pages.

Burcham, "Ray Ozzie Got the Memo" Mar. 22, 2006, Webpage Available at: http://lesscode.org/2006/03/22/ray-ozzie-got-the-memo/, 3 pages.

Obasanjo, "Metadata Quality, Events Databases and Live Clipboard" Apr. 3, 2006. Webpage Available at http://www.25hoursaday.com/weblog/PermaLink.aspx?guid=91e40df6-c973-4bf7-8eb6-05c778d8cd90, 2 pages.

"Clipboard", 2008 Microsoft Corporation. Webpage Available at: http://msdn.microsoft.com/library/default.asp?url=/library/en-us/winui/winui/windowsuserinterface/dataexchange/clipboard.asp, 6 pages.

Dargahi, "A Pint of ALE—Ajax Linking and Embedding", Apr. 3, 2006. http://www.zimbrablog.com/blog/archives/2006/04/a-pint-of-ale-ajax-linking-and-embedding.html, 5 pages.

"Live Clipboard—Wiring the Web" Jul. 4, 2008, Webpage Available at: http://liveclipboard.org/, 2 pages.

"Understanding OLE", eZine, 2001. Webpage Available at: http://www.glencoe.com/ps/computered/pas/article.php4?articleId=149, 3 pages.

Burcham, "Ray Ozzie Demos Web App Clipboard", Mar. 21, 2006. Webpage Available at: http://www.memerocket.com/2006/03/21/ray-ozzie-demos-web-app-clipboard/, 6 pages.

Spaces—Ray Ozzie Blog, "Wiring Progress", Apr. 1, 2006 http://web.archive.org/web/20061019185756/http://rayozzie.spaces.live.com/?11_BlogPart_FullView=1&_c11_BlogPart_blogpart=blogview&_c=BlogPart&partqs=amonth%3d4%26ayear%3d2006, 3 pages.

"Ray Ozzie Wants to Wire the Web. and so should you" Retrieved on Jul. 4, 2008 Webpage available at: http://liveclipboard.org/, 1 page.

"Copy Structured Data between Web Sites through RSS: Ray's Live Clipboard Is Next", Mar. 31, 2006, pp. 7.

"Live Clipboard Technical Introduction", Retrieved on Dec. 11, 2007: retrieved at <<http://spaces.live.com/editorial/rayozzie/demo/liveclip/liveclipsample/techPreview.html>>, pp. 2.

Non-Final Office Action cited in related U.S. Appl. No. 11/532,390 dated Mar. 13, 2009.

Final Office Action cited in related U.S. Appl. No. 11/532,390 dated Sep. 23, 2009.

Non-Final Office Action cited in related U.S. Appl. No. 11/532,390 dated Jan. 26, 2010.

Final Office Action cited in related U.S. Appl. No. 11/532,390 dated Jul. 22, 2010.

Non-Final Office Action cited in related U.S. Appl. No. 11/532,390 dated Jun. 24, 2011.

Notice of Allowance cited in related U.S. Appl. No. 11/532,390 dated Dec. 13, 2011.

Non-Final Office Action cited in related U.S. Appl. No. 11/557,004 dated Nov. 18, 2008.

Final Office Action cited in related U.S. Appl. No. 11/557,004 dated Jun. 12, 2009.

Non-Final Office Action cited in related U.S. Appl. No. 11/557,004 dated Nov. 12, 2009.

Final Office Action cited in related U.S. Appl. No. 11/557,004 dated Jul. 23, 2010.

Notice of Allowance cited in related U.S. Appl. No. 11/557,004 dated May 13, 2011.

Notice of Allowance cited in related U.S. Appl. No. 11/557,004 dated Jun. 14, 2011.

Non-Final Office Action cited in related U.S. Appl. No. 11/621,423 dated Mar. 18, 2009.

Final Office Action cited in related U.S. Appl. No. 11/621,423 dated Oct. 16, 2009.

Non-Final Office Action cited in related U.S. Appl. No. 11/621,423 dated Apr. 1, 2010.

Notice of Allowance cited in related U.S. Appl. No. 11/621,423 dated Oct. 7, 2010.

Notice of Allowance cited in related U.S. Appl. No. 11/621,423 dated Sep. 16, 2011.

Non-Final Office Action cited in related U.S. Appl. No. 11/621,433 dated Aug. 20, 2009.

Final Office Action cited in related U.S. Appl. No. 11/621,433 dated Mar. 18, 2010.

Non-Final Office Action cited in related U.S. Appl. No. 11/621,433 dated Aug. 31, 2010.

Final Office Action cited in related U.S. Appl. No. 11/621,433 dated Jan. 27, 2011.

Non-Final Office Action cited in related U.S. Appl. No. 11/674,046 dated Apr. 16, 2010.

Final Office Action cited in related U.S. Appl. No. 11/674,046 dated Oct. 28, 2010.

Non-Final Office Action cited in related U.S. Appl No. 11/674,046 dated Apr. 29, 2011.

Final Office Action cited in related U.S. Appl. No. 11/674,046 dated Oct. 21, 2011.

"Introducing unAPI", Daniel Chudnov, Peter Binkley, Jeremy Frumkin, Michael J. Giario, Mike Rylander, Rose Singer and Ed Summers, Ariadne Issue 48. Jul. 2006, Publication Date: Jul. 30, 2006, pp. 1-15. Reprinted from the Internet at: http://www.ariadne.ac.uk/issue48/chudnov-et-al.

"Breaking the Copy/Paste Cycle: The Stretchable Tool", Mark D. Apperley, Dale Fletcher and William J. Rogers, Interface Conference, First Australisian User Interface Conference, 2000, 4 pgs., reprinted form the Internet at: http://doi.ieeecomputersociety.org/10.1109/AUIC.2000.822057.

"Replicated Document Management in a Group Communication System", Leonard Kawell Jr., Steven Beckhardt, Timothy Halvorsen and Raymond Ozzie, Presented at the Second Conference on Computer-Supported Cooperative Work, Portland, Oregon, Sep. 26-28, 1988, 10 pgs.

"Outwit: Unix Tool-based Programming Meets the Windows World", Diomidis D. Spinellis. In Christopher Small, editor, USENIX 2000, Technical Conference Proceedings, pp. 149-158, Berkley, CA, Jun. 2000 http://dmst.aueb.gr/dds/pubs/conf/2000-Usenix-outwit/html/utool.html.

Reply to Non-Final Office Action cited in related U.S. Appl. No. 11/532,390 dated Sep. 26, 2011, 13 pgs.

Reply to Non-Final Office Action cited in related U.S. Appl. No. 11/621,423 dated Jun. 18, 2009, 11 pgs.

Reply to Final Office Action cited in related U.S. Appl. No. 11/621,423 dated Dec. 16, 2009, 10 pgs.

Reply to Non-Final Office Action cited in related U.S. Appl. No. 11/621,423 dated Jun. 30, 2010, 16 pgs.

Non-Final Office Action cited in related U.S. Appl. No. 11/674,054 dated Jul. 24, 2009, 19 pgs.

Reply to Non0Final Office Action cited in related U.S. Appl. No. 11/674,054 dated Nov. 19, 2009, 15 pgs.

Final Office Action cited in related U.S. Appl. No. 11/674,054 dated Mar. 8, 2010, 29 pgs.

Reply to Final Office Action cited in related U.S. Appl. No. 11/674,054 dated Jun. 30, 2010, 15 pgs.

Non-Final Office Action cited in related U.S. Appl. No. 11/674,054 dated Oct. 19, 2011, 24 pgs.

Reply to Non-Final Office Action cited in related U.S. Appl. No. 11/674,054 dated Dec. 29, 2011, 16 pgs.
Final Office Action cited in related U.S. Appl. No. 11/674,054 dated Mar. 16, 2012, 33 pgs.
Non-Final Office Action cited in related U.S. Appl. No. 11/681,321 dated Jan. 27, 2009, 13 pgs.
Reply to Non-Final Office Action cited in related U.S. Appl. No. 11/681,321 dated Apr. 27, 2009, 14 pgs.
Final Office Action cited in related U.S. Appl. No. 11/681,321 dated Jul. 13, 2009, 15 pgs.
Rely to Final Office Action cited in related U.S. Appl. No. 11/681,321 dated Oct. 19, 2009, 13 pgs.
Advisory Action cited in related U.S. Appl. No. 11/681,321 dated Dec. 2, 2009, 3 pgs.
Non-Final Office Action cited in related U.S. Appl. No. 11/681,321 dated Apr. 23, 2010, 18 pgs.
Rely to Non-Final Office Action cited in related U.S. Appl. No. 11/681,321 dated Jul. 23, 2010, 13 pgs.
Notice of Allowance cited in related U.S. Appl. No. 11/681,321 dated Sep. 1, 2010, 6 pgs.
Supplemental Notice of Allowance cited in related U.S. Appl. No. 11/681,321 dated Oct. 28, 2010, 2 pgs.
Notice of Allowance cited in related U.S. Appl. No. 11/861,321 dated Jan. 13, 2011, 7 pgs.
Rely to Notice of Allowance cited in related U.S. Appl. No. 11/861,321 dated Mar. 7, 2011, 9 pgs.
"Snarler", 2005, reprinted from he Internet at: http://snarfware.com/download.htm, 1 pg.
Ozzie, Ray, "Ray Ozzie Blog: Wiring the Web", http://rayozzie.spaces.live.com/blog/cns@FB3017FBB9B2E142!285.entry. Mar. 7, 2006, 5 pgs.
Ozzie, et al., "SimpleSharing Extensions for RSS and OPML", Version 0.91, Dec. 1, 2005, http://blogs.msdn.comirssteamiarchive1200S/12/01/498704/aspx, pp. 1-6.
Ozzie, et al., "Simple Sharing Extensions for Atom and RSS", May 7, 2007, http://msdn.microsoft.com/en-us/library/windows/desktop/gg427657(v=vs.85).aspx, 20 pgs.
"Live Clipboard—Wiring the Web", retrieved Dec. 14,2008, http://livelcipboard.ord, 2 pgs.
Notice of Allowance cited in related U.S. Appl. No. 11/621,423 dated Mar. 21, 2012, 7 pgs.
Non-Final Office Action cited in related U.S. Appl. No. 11/621,433 dated Mar. 14, 2012, 12 pgs.
"JavaScript Bible", Danny Goodman, Michael Morrison and Brandon Eich, (John Wiley & Sons) Apr. 8, 2007, JavaScript, 15pgs.
"Clipboard copy/paste detection", Coded Guru Forums, available to http://www.codeguru.com/forum/showthread/php?t=343977, posts dated 2005-2007, 17 pgs.
"Juxmem: An Adaptive Supportive Platform for Data Sharing on the Grid", Gabriel Antoniu, Lue Bouge and Mathieu Jan, No. 4917, Sep. 2003, Reprinted from the Internet at: Http://academic.research.microsoft.com/Paper/5749392.aspx, 11 pages.
"A Distributed Platform for Archiving and Retrieving RSS Feeds", David Chmielewski and Gongzhu Hu, Proceedings of the Fourth Annual ACIS International Conference on Computer and Information Science (ICIS 2005), Publication date: 2005, 6 pages.
"Simple Sharing Extensions Up Close", Cori Shlegel, http://kinrowan.net/blog/wp/archies/2005/11/23/sse-up-close, Nov. 23, 2005, 9 pgs.
"Simple Sharing Extensions for Atom and RSS" Jack Ozzie, George Moromisato, Matt Augustine, Paresh Suthar and Steven Lees, May 7, 2008, http://msdn.microsoft.com/en-us/library/windows/desktop/gg427657(v=vs.85).aspx, 20 pgs.
"How Simple Sharing Extensions Will Change the Web", http://web2_wsj2.com/how_simple_sharing_extensions_will_change_the_web.htm., Nov. 28, 2005, 10 pgs.
"Live Clipboard XML Schema", Jack Ozzie, et al., updated Apr. 21,2006, retrieved at <<http://spaces.live.com/editorial/rayozzie/demo/lieslip/specification/v092.html>>, 15 pages.
"Breaking the Copy/Paste Cycle: The Stretchable Tool", Mark D. Apperley, Dale Fletcher and William J. Rogers, Interface Conference, First Australian User Interface Conference, 2000, reprinted from the Internet at: http://doi,ieeecomputersociety.org/10.1109/AUIC.2000.822057, 8 pages.
"Version Headers for Flexible Synchronization and Conflict Resolution", Ken Rimey, Nov. 22, 2004, reprinted from the Internet at: http://www.hiit.fi/publications/pub_files/hiit-2004-3.pdf, 14 pages.
"Simple Sharing Extensions for RSS and OPML", Jack E. Ozzie, et al., Version 0.91, updated Jan. 12, 2008, reprinted from the Internet at: http://msdn.microsoft.com/en-us/library/bb190613.aspx, 10 pages.
"Snarfer", Last entered on Dec. 14, 2008, reprinted from the Internet at: http://snarfware.com/download.htm, 1 pg.
"LiveShare Plus" ®1997 Picture Tel Corporation, 2 pgs.
"Dueling Simplicities", Jon Udell, Nov. 22, 2005, reprinted from the Internet at: http://onudell.net/udell/2006-11-22-dueling-simplicities.html, 4 pgs.
"Frequently Asked Questions for Simple Sharing Extensions (SSE)", MSDN, Copyright 2006, Microsoft Corporation, http://msdn.microsoft.com/xml/rss/ssefaq/, 4 pgs.
"Microsoft Team RSS BLOG, More on SSE", Dec. 7, 2005, http://blogs.msdn.conn/rssteam/archive/2006/12/07/501326.aspx, 2 pgs.
"Ray Ozzie Blog: Really Simple Sharing", http://rayozzie.spaces.live.com/blog/cns/FB3017FBB9B2F.entry, Nov. 20, 2005, 4 pgs.
"Microsoft Team RSS Blog: SSE Update and Tutorial", Jan. 25, 2006, http://blogs.msdn.com/ssteam/archive/2006/01/25/517473.aspx., 3 pgs.
"A Pint of ALE—Ajax Linking and Embedding", Apr. 3, 2006m Posted in Open Source, Zimbra Web Client by Ross Dargahi on Apr. 3, 2006, http://www.zimbrablog.com/blog/archives/2006/04/a-pint-of-ale-ajax-linking-and-embedding.html, pp. 1-5.
"Implementing the Cut-and-Paste Operation in Structured Editing System", Cecile Roisin and Extase Akpotsui, http://www.oasis-open.org/cover/rois-impi-ps.gz, Mar. 1994, 14 pgs.
"Deployment of a Large-scale Peer-to-Peer Social Network", Maoyang, Hua Chen, Ben Y. Zhao, Yafei Dai and Zheng Zhang, Microsoft Research Asia, Beijing, China, last entered on Dec. 14, 2006, http://www.usenix.org/event/worlds04/tech/full_papers/yang/yang.pdf, 6 pgs.
"Attensa Feed Server-Secure, Scalable Web Feed Server", last entered in Dec. 14, 2008, http://www.attensa.com/products/server/, 2 pgs.
Ektron CMS200, Dec. 14, 2008, http://www.edtron.com/manuals/datasheets/EktronCMS200-datasheet.pdf. 3 pgs.
RSSOwl/RSS/RDF/Atom Newsreader, Feb. 1, 2007, http://download.cnet.com/RSSOwl-RSS-RDF-Atom-Newsreader/3000-2164_4-10454013.html. 3 pgs.
"Enterprisse RSS the Center of Attention", Dec. 14, 2006, http://attensa.typepad.com/attensa/files/attensa_enterprise_rss_whitepaper_0605.pdf., 11 pgs.
"RSS and Atom: Understanding and Implementing Content Feeds and Syndication", 2006, http://www.packtpub.com/rss/book, 37 pgs.
"RSS as a Distribution Medium for Geo-spatial Hypermedia", Frank Allan Hansen, Bent Guldberg Christenson and Miels Olof Bouin, HT'05, Sep. 2005, Salzburg, Austria, Copyright 2005, ACM, http://www.daimi.au.dk/~fah/papers/hansen-ht05.pdf, 3 pgs.
"Working XML: Expand RSS capabilities with RSS extensions", Aug. 15, 2006, http://www.ibm.com/developerworks/xml/library/x-wxxm36/. 7 pgs.
"Enhanced enclosures support in RSS and ATOM Syndication", Vadim Zaliva and Alexander Sova, Dec. 15, 2004, http://www.crocodile.org/lord/RSSenclosures/RSSenclosures.pdf, 18 pgs.
"vcard: The Electronic Business Card", A versit Consotium White Paper, Jan. 1, 1997, Version 2.1, http://www.imc.org/pdi/vcardwhite.html, 5 pgs.
"The Technical Infrastructure of the Live Project", Tomi Nummi, Dec. 14, 2006, http://www.edu.helsinki.fi/media/mep6/summi.pdf, 11 pgs.
Atom Enabled, "What is Atom?", Apr. 5, 2007, http://atomenabled.ord/, 3 pgs.
The Atom Publishing Protocol:, Mar. 4, 2007, copyright the IETF Trust 2007, http://bitworking.org/project/atom/draft-ietf-etompub-protocol-04.html, 60 pgs.

Front Page Atom Wiki; The Atom Project:, Apr. 5, 2007, http://intertwingly.net/wiki/pie/FrontPage, 1 pg.

RFC, MetaWeblog API', Dave Winer, Mar. 14, 2002, http://www.xmlrpc.com/metaWeblogApi, 4 pgs.

"Google Data API's (Beta) Developers Guide: Google Data API's Overview", Apr. 5, 2007, http://code.google.com/apis/gdata/overview.html, 1 pg.

"Clipboard: Adding Other Formats", 2006. Microsoft Corporation. Webpage Available at: http://msdn2.microsoft.com/en-us/library/838a3whf(vs.80,d=printer).aspx. 1 page.

"Citrine: Providing Intelligent Copy-and-Paste", Jeffrey Stylos, Brad A. Myers and Andrew Faulring, UIST '04, Oct. 24-27, 2004, Santa Fe, New Mexico, USA, 4 pgs.

"Live Clipboard Technical Introduction", Reprinted from the Internet on Jul. 3, 2008, webpage available at: http://spaces.live.com/editorial/rayozzie/demo/liveclip/liveclipsample/techPreview.html, 2 pgs.

"Live Clipboard", Version 0.92, Apr. 21, 2006. Webpage available at http://spaces.live.com/editorial/rayozzie/demo/liveclip/specification/v092.html, 15 pgs.

"Live Clipboard Example", Preintef from the Internet on Jul. 3, 2008, Webpage Available at: http://spaces.live.com/editorial/rayozzie/demo/liveclip/liveclipsample/clipboardexample.html, 2 pgs.

"Live Clipboard Screencasts", Preinted from the Internet on Jul. 3, 2008, Webpage Available at: http://spaces.live.com/editorial/rayozzie/demo/liveclip/screencast/liveclipdemo.htmlm 1 pg.

Burcham, "Baby Steps to Synergistic Web Apps", Oct. 21, 2005, Webpage Available at: http://lesscode.org/2005/10/21/baby-steps-to-synergistic-web-apps/, 11 pgs.

Burcham, "Half a Baby Step", Nov. 2, 2005, Webpage Available at: http://lesscode.org/2005/11/02/half-a-baby-step/, 4 pgs.

Burcham, "Ray Ozzie Got the Memo", Mar. 22, 2006, Webpage Available at: http://lesscode.org/2006/03/22/ray-ozzie-got-the-memo/, 3 pgs.

Obasanjo, "Metadata Quality, Events Databases and Live Clipboard" Apr. 3, 2006. Webpage Available at http://www.25hoursaday.com/weblog/PermaLink.aspx?guid=91e40df6-c973-4bf7-8eb6-05c778d8cd90, 2 pgs.

"Clipboard", 2008 Microsoft Corporation. Webpage Available at: http://msdn.microsoft.com/library/default.asp?url=/library/en-us/winui/winui/windowsuserinterface/dataexchange/clipboard.asp, 6 pgs.

"Understanding OLE", eZine, 2001. Webpage Available at: http://www.glencoe.com/ps/computered/pas/article.php4?articleId=149, 3 pgs.

* cited by examiner

CLIPBOARD DATA 310

STRUCTURED DATA 320

STRUCTURED DATA FORMAT 1 330

ITEM 1 334

ITEM N 336

STRUCTURED DATA FORMAT N 332

FEED DATA 350

FEED 1 360

FEED ITEMS 1 364

FEED ITEM 1 366

FEED ITEM N 367

FEED ITEMS N 368

FEED N 362

PRESENTATION DATA 380

PRESENTATION FORMAT 1 390

PRESENTATION FORMAT N 392

OTHER DATA 395

ENABLING ACCESS TO RICH DATA BY INTERCEPTING PASTE OPERATIONS

BACKGROUND

Clipboard systems are a common part of many modern operating systems or computer systems. Typically a clipboard system enables applications or other entities to "copy" or "cut" data to a computer-implemented "clipboard," and enables the same or other applications or entities to "paste" data from the clipboard. The clipboard is available to or shared between applications and entities and enables the transfer of information or data between such applications and entities.

At least some clipboard systems enable the transfer of multiple pieces of data as well as the transfer of data in multiple formats. For example, in some clipboard systems an application may have the ability to add a single logical piece of data or information to the clipboard in multiple different formats. For example, an application might place a text representation of a piece of data as well as an image representation of the same piece of data on the clipboard. A destination application to which such a piece of data may be pasted might then be able to access the format of the data that is most useful to the destination application.

In order to participate in information sharing or transfer using a clipboard, any executable code or application must generally have the ability to interact with the clipboard system. Such interaction may be accomplished through the use of application programming interfaces (APIs) or a variety of other mechanisms. While some applications or entities may have the ability to access the full capabilities of a clipboard system—including perhaps the ability to request alternative data formats for a particular piece of data on the clipboard, in some cases at least some applications may only have access to a limited subset of a clipboard system's functionality. As just one example, a page displayed by a web browser typically only has access to data on a clipboard that is formatted as text. That is, even if the clipboard includes, say, an image or one or more other representations of a piece of data, and even if the page may have the capability of using these other representations of the data, the page may not be able to access the other data formats.

SUMMARY

The following presents a simplified summary of the disclosure in order to provide a basic understanding to the reader. This summary is not an extensive overview of the disclosure and does not identify key or critical elements of the invention or delineate the scope of the invention. Its sole purpose is to present some concepts disclosed herein in a simplified form as a prelude to the more detailed description that is presented later.

Described herein are various techniques and technologies directed to enabling access to additional and sometimes "richer" data formats in applications or other entities that may not typically be able to access such additional data. More particularly, in at least some implementations, data copied to a clipboard and formatted using a variety of formats may be provided or accessed by a destination application as part of a paste operation even when the destination application may not natively provide the ability to access all of the data formats that might exist on a clipboard. In at least some implementations, such access may be provided without modifying or augmenting the data placed on the clipboard.

DETAILED DESCRIPTION

Figure 1:
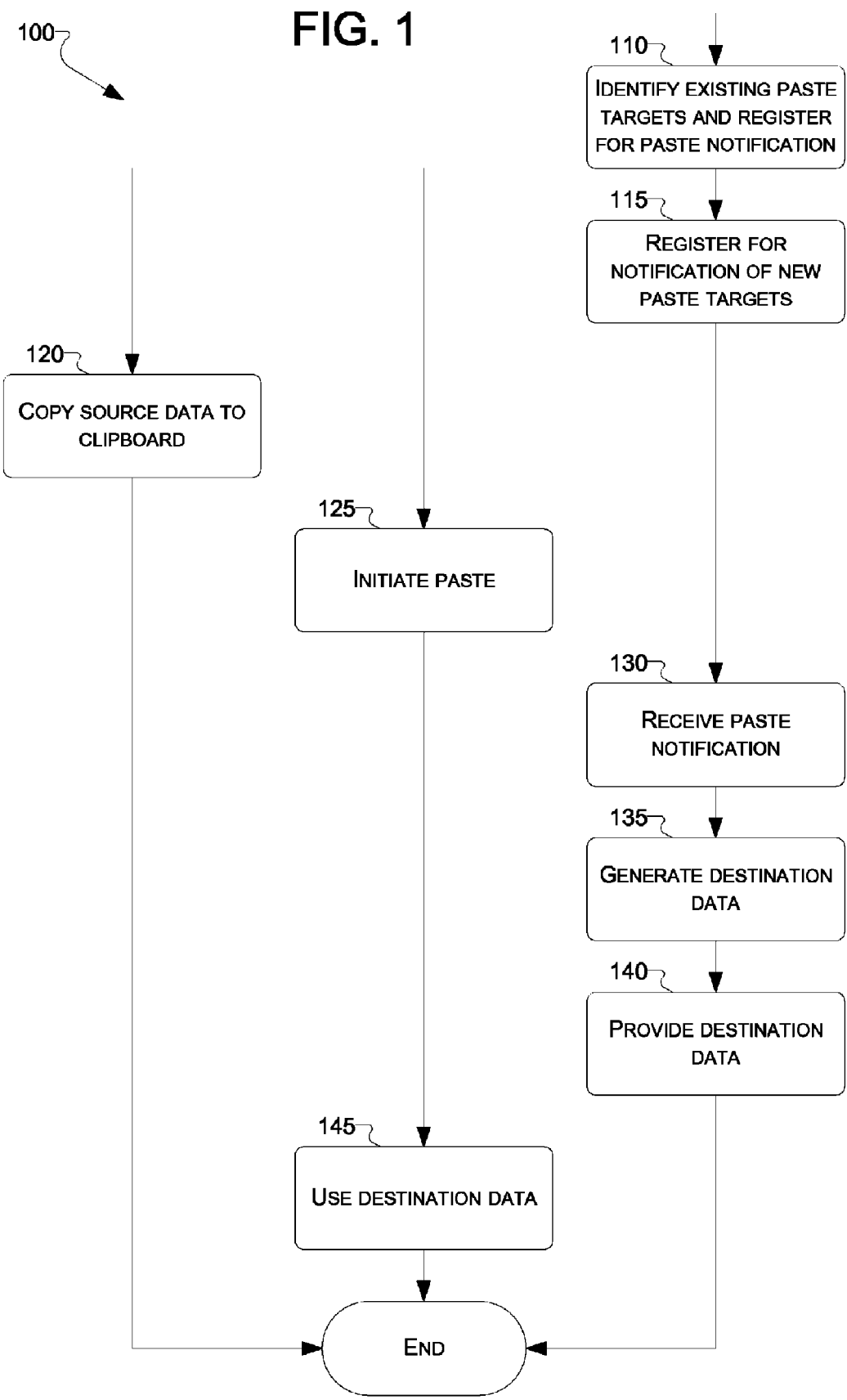
FIG. 1 illustrates an exemplary generalized operational flow including various operations that may be performed when enabling access to rich data when interacting with a clipboard system.

Described herein are various techniques and technologies directed to enabling access to additional and sometimes "richer" data formats in applications or other entities that may not typically be able to access such additional data. More particularly, in at least some implementations, data formatted using a variety of formats may be provided or accessed by a destination application even when the destination application may not natively provide the ability to access all of the data formats that might exist on a clipboard. In at least some implementations, such access may be provided without modifying or augmenting the data placed on the clipboard.

As used herein, a "clipboard" or "clipboard system" should be interpreted as an entity that provides functionality associated with the transfer of data between different entities, including, for example, between different applications, web pages, and so on. Some clipboard systems may provide the capabilities of adding data to a "clipboard"—perhaps associated with a copy or cut operation—and reading data from a clipboard—perhaps associated with a paste operation. The same or other clipboard systems may provide the ability to hold multiple pieces of data, or items, at the same time. Furthermore, the same or other clipboard systems may provide the ability to hold multiple representations or formats for a particular data item. For example, a clipboard system might have the ability to hold, say, a formatted text, plain text, and image representation of the same item. The same or other clipboard systems may enable a destination application to use or request a particular format or representation of an item. For example, a word processing application might use the formatted text representation, a simple text editor the plain text representation, and an image processing application the image representation. Some applications may enable a user to choose between multiple representations or formats and paste one or more of such representations. For example, some applications provide a "paste special" or other similar option that enables the user to choose between multiple formats when pasting information.

While many applications—including the word processing, text editor, and image processing applications introduced in the previous paragraph—may have the capability of accessing one or more data formats associated with data items on the clipboard, in at least some implementations some applications may only have the capability of accessing a limited set of data formats or a single data format. For example and in at least some implementations, a web browser as well as pages or other information displayed or provided by a web browser may only be able to access a simple text representation of a data item that exists on the clipboard. Furthermore, executable code included in web pages or other information displayed by a browser—such as JavaScript code included with or referenced by an HTML page—may only have the capability of accessing a text representation of a data item that exists on the clipboard.

While some applications or entities may only have access to a single or more limited set of data formats or representations, it may still in some implementations be possible to transfer or communicate richer or more extensive data. As just one example, additional or richer data might be represented as text—say, as XML or using some other data representation language or format—and then the richer text might be communicated using the clipboard, perhaps using only a "plain text" or similar clipboard format. One specific example of a text format that can hold rich data is the Live Clipboard format. In some implementations, a format such at the Live Clipboard format, or other format, may define one or more ways to represent, encode, or otherwise make available for transfer a variety of additional or richer data. In the case of Live Clipboard, for example and without limitation, the data format may enable the transfer of "structured" data including XML or other representations of a variety of data, references to "feeds," and references to "presentation" data that may be used as part of displaying the data. The Live Clipboard format is described in more detail elsewhere herein, including below with reference to FIG. 3.

Generally as used herein, the terms "structured information" or "structured data" may refer to information or data that has additional meaning when compared to plain text. For example, a text field that contains, say, a first name or last name, might not comprise structured data. In contrast, an XML fragment that conforms to the hCard schema, or some other schema, for representing contact information, and contains, say, name, address, phone number, email address, and so on, in a structured format such as, for example, the hCard format, would be considered structured data. Structured information may also in some embodiments include a wide variety of other information. For example, structured information may include information about the data—metadata—like its type or content type, as well as references to other or additional data, and so on. Furthermore, although this example mentions hCard and XML, it is important to note that structured data is not limited to hCard and XML information and may comprise a wide variety of data types and be represented using a wide variety of data representation formats. Similarly, a reference may in some embodiments be implemented using something like a Uniform Resource Locator (URL) that identifies information, like a changed or updated version of copied data, or a "Really Simple Syndication" or "Rich Site Summary" ("RSS") or Atom feed, at some endpoint on a network. However, a reference may be embodied in a variety of ways and may identify information of a wide variety of types.

A text or richer format, such as the Live Clipboard format, may be used in a variety of ways. For example, a source application or a web page hosted in a browser might include executable code—such as JavaScript, perhaps—that generates and places data represented in a richer format on the clipboard. In some examples, such data might be indicated to the clipboard system as using the text format and, as a result, when that data is pasted to a destination application that requests the text format, all of the rich data represented using the richer format may be provided to the destination application.

If the destination application has the capability of interpreting the richer data, it may be able to do additional processing or provide additional functionality that might not be possible without access to the richer data. As just one specific example, suppose that a user views a web page that displays contact information for a variety of people or other entities. In this example, when the user selects a particular contact or contacts and indicates that they want to copy the selected contact information to the clipboard, the page might generate, say, a Live Clipboard representation of the contact information—perhaps using hCard—and place the resulting Live Clipboard XML on the clipboard. Further suppose that the user then pastes the Live Clipboard data on the clipboard to another web page or some other application and, for the purposes of this example, that the destination page or application is also associated with maintaining contact information. If the user pastes the information into an application that can recognize that the pasted data includes Live Clipboard information, or even just hCard information, the destination application might be able to, for example, treat the pasted data as comprising information for a full contact (or perhaps set of contacts), and maybe even automatically create "contacts" or other data entities. In contrast, if the user pastes the richer data into an application such as a simple text editor that does not recognize or treat the richer data in any particular special manner, the text editor may just display the text—in this case, this might simply mean that the Live Clipboard XML might be included in the document or text currently being displayed by the text editor application.

Richer formats may enable the transfer of richer data in some implementations, but the existence of a richer data format represented, for example, as text, and even the existence of destination applications or entities that can interpret the richer data format are not always sufficient to enable the transfer of richer information between entities or applications. One common example where a richer data format isn't sufficient may occur when a source application is not aware of or does not provide data using a richer data format that can be understood by a destination application. For example, a source application might not be aware of the Live Clipboard format and might not add information that uses the Live Clipboard format to a clipboard. In some implementations it may be possible to convert or augment data so that the data can be understood by a destination application. For example, it may be possible to recognize when information about a contact is placed on a clipboard and then convert this information to a format such as the Live Clipboard format.

However, even if source data can be converted to a data format that can be understood by a destination application, there may in some cases be no suitable way to place such information on the clipboard so that it can be accessed by the destination application. As an example, suppose a user of a personal information management application (or PIM application)—say, perhaps, the Microsoft Outlook application written by Microsoft Corporation of Redmond, Wash.—indicates that they want to copy a calendar item or appointment to the clipboard. The PIM application might create a data item on the clipboard that represents the calendar item. Such a data item might contain information associated with the calendar item in a simple text format—not as Live Clipboard or some other richer data format, but simply as, say, the description of the calendar item and the time and date, separated by tabs, commas, or some other delimiter. This simple text representation of the calendar item enables a user to paste information about the calendar item or event into a text editor or other application. The data item added by the PIM application might also contain the calendar item information in one or more other richer formats—for example, in the case of Microsoft Outlook, the calendar information might be represented using a format like the iCalendar format and then such iCalendar information might be included on the clipboard as a reference to a file with an .ics extension or as an "ICS file." As a result of the multiple data formats added to the clipboard for this single data item, if the user subsequently pastes the data item into a simple text editor, they might see the contact information in the simple text format. If they paste the data item into an application that can interpret file references with iCalendar data, that application might be able to interpret and use all of the rich information represented in the attached or referenced file.

However, if they paste such a data item into a web page or other application that could interpret and use rich calendar item information represented using a text format—like Live Clipboard in some cases—but that might only have access to information on the clipboard in a text format (or might have access only to some other format or set of formats), the web page or application might not be able to access the richer or more extensive information. That is, as the destination application in this case might only have access to the simple text representation that doesn't include all of the calendar item information, the destination application may not be able to access all of the calendar information, even though the application has the capability of using more extensive calendar information and even though the more extensive information exists in the referenced ICS file.

In some cases one attempt to resolve such a problem might involve the use of a "converter" or "adapter" application that, say, "watches" or observes the clipboard and, in this specific example, upon seeing a data item with a referenced ICS file, converts the data in the ICS file to a Live Clipboard data and then replaces the simple text representation of the data item that is already on the clipboard with the Live Clipboard representation. However, this relatively simple approach also has a few problems, the biggest of which is that it requires deleting information that is already on the clipboard, by replacing the simple text representation with the more complex Live Clipboard representation. In general and with many computer systems or clipboard implementations, overwriting or deleting information on the clipboard is at best considered a bad practice and may not be allowed (instead, the recommended approach—when all applications can access multiple data formats—is generally to add alternative data formats). In this example if the simple text representation is overwritten with a Live Clipboard representation, a user that pastes the calendar data item into an application that can interpret Live Clipboard data may have access to richer data, but a user that pastes the calendar item into an application that cannot interpret the Live Clipboard data might see an extensive amount of XML rather than simply the short and easy-to-read text representation that was originally placed on the clipboard.

The techniques and technologies described herein are directed to resolving this problem by, in at least some implementations, making a richer representation of a data item—such as perhaps a Live Clipboard representation—available to some applications while not changing the representation on the clipboard or changing the experience of other applications or entities that also might use the data item. In at least some implementations, elements of the techniques and technologies described herein may intercept paste operations and then provide a richer representation of data on the clipboard to the destination.

Turning now to FIG. 1, shown therein is an exemplary generalized operational flow 100 including various operations that may be performed when enabling access to rich data when interacting with a clipboard system. Operations that may be associated with a source application, from which data is copied (or cut), may in some implementations be associated with the first column; operations that may be associated with a destination application, to which data may be pasted, may in some implementations be associated with the second column; and operations associated with an adapter or converter application or other executable code may in some implementations be associated with the third column. The following description of FIG. 1 may be made with reference to other figures. However, it should be understood that the operational flow described with reference to FIG. 1 is not intended to be limited to being used with the elements described with reference to these other figures. In addition, while the exemplary operational flow of FIG. 1 indicates a particular order of execution and is divided into three columns, in one or more alternative embodiments the operations may be ordered differently and may be performed by just a single entity or application or may be performed by other combinations of applications or executable code. Furthermore, while the exemplary operational flow contains multiple steps, it should be recognized that in some implementations at least some of these operations may be combined or executed contemporaneously.

In an exemplary implementation of operation 110, an adapter application or other executable code may identify existing paste targets that can receive richer data and, when identified, may register for notification of paste operations initiated using identified paste targets.

Generally, a "paste target" may be understood herein to refer to some entity by which a user or other executable code may initiate a paste operation, where the entity may be associated with receiving, interpreting, or otherwise using richer data. Paste targets may take a variety of forms and be implemented in a variety of ways. In one example, a paste target might comprise an "edit control" or "text box control" of some type. With such an exemplary edit control, a user may click or take some other operation to "select," "give focus to," or otherwise indicate a desire to interact with the edit control, and may then choose to paste information from the clipboard in one or more of a variety of ways, including through the use of a menu item, a keyboard shortcut, and so on. Other types of paste targets may have different visual appearances (or may have no visible appearance at all), and may be interacted with in the same or other ways.

In some implementations, only particular edit controls or other elements may be considered to be paste targets, and such a differentiation—if it exists—may be made in a variety of ways. In such implementations, some elements of a user interface—for example, some edit controls or text boxes—may be enabled to support the pasting of richer data, while other elements of a user interface, including perhaps other edit controls or text boxes, are not so enabled. For example, in an implementation where a user interface is represented using a technology like HTML, an edit control may be defined, as just two examples, using an HTML "input" element with a "type" attribute set to the value "text" or using an HTML "textarea" element. In at least some of such implementations, an edit control that is to support the pasting of richer data might have, for example, a "class" attribute with a particular value or name, or might be denoted in some other fashion. Other edit controls may not have or use the same value or name for the "class" attribute or other characteristic and therefore may in some implementations be considered to not support the pasting of richer data as described herein. In some implementations, which edit controls enable the pasting of richer data may be determined in other ways, or all edit controls may support the pasting of richer data without the use of any particular identifying characteristic.

In at least some exemplary implementations, a paste target may include or be associated with an HTML "div" element and an edit control or text control, including an HTML "input" element with a "type" attribute set to the value "text," or an HTML "textarea" element. The paste target may have some kind of visible representation, like an image associated in some fashion with the "div" element. In other implementations, the paste target may just comprise an edit control itself, or might comprise some other arrangement or composition of one or more user interface elements or controls. In some implementations, the edit control may be transparent or not visible—in at least some of such implementations, an image or other user interface element or elements that are associated with the edit control or with a containing element, like a "div" element, may enable a user to interact with the paste target. If the edit control is not visible, it may appear to a user that they are interacting with the visible user interface element—the image, say—when they are in fact interacting with the edit control.

Furthermore, in at least some implementations a paste target may have another user interface representation, or may not have any explicit user interface or visible representation at all. For example, an application or web page itself—not just a particular part or user interface element of the application or web page—may in some cases be implemented to respond to paste initiation operations—such as a keyboard command like "Control-V"—by initiating a paste operation. In at least some of such implementations, the resulting destination data may be placed in some part of the user interface, possibly independently of where the mouse or other selection was at the time the paste operation was initiated. As just one example, a paste operation performed "anywhere" on a particular web page might result in the pasting of information at, say, the bottom of a list being displayed as part of the page. In the same or yet other implementations, destination data provided to the destination may not result in any visible change in the user interface. For example, destination information might be processed, saved, or otherwise used in some manner without any change to the user interface.

Once a paste target has been defined or exists—for example, because the author of an HTML page has included an edit control with a particular "class" attribute in a page—the identification of paste targets may be accomplished in a variety of ways depending on characteristics such as the nature of the destination applications that include paste targets, the operating system in use, and so on. In at least some implementations, at least part of identifying paste targets may involve enumerating user interfaces, applications, or the like, and further enumerating elements that might be paste targets. As just one very specific example, and without limitation, when paste targets that enable access to richer data may occur as part of a web page displayed by a browser, paste targets may be identified by enumerating all of the web browser applications, web browser tabs, web browser windows, and the like. In the specific case of the Internet Explorer application written by Microsoft Corporation, each user interface element that displays a web page may exist as an operating system "window," and also have at least some characteristics that are shared between instances of the window that displays web pages or other content, such as the same name. In the case of Internet Explorer, a window that displays web pages or other content may be referred to, for example, as a "web browser control" or the like. In such an implementation, the identification of paste targets may be accomplished, in part, by first identifying each web browser control or each window that has this particular name. (In the case of Internet Explorer and also with other applications, this may enable the identification of paste targets in applications that use, contain, or include web browser controls, even when the applications are not considered to "web browser" applications. For example, the Visual Studio development environment, also produced by Microsoft, uses web browser controls to display help information in at least some implementations.)

It should be noted that in at least some contexts and at least some of the time, an operating system window is separate from and not the same as a "window" that might typically be perceived by a user. For example, an operating system window might be any operating system entity that has a "window handle," which might include a wide array of windows that, for example, do not have menu bars, maximize and minimize buttons, and so on; do not have the capability of being independently moved; and the like. For example, in the case of the Microsoft Windows operating system, many elements of a "window" perceived by a user may in and of themselves be windows—for example, in some cases a button may be a window, a text box may be a different window, and so on.

In specific examples that use web browser controls or the like, the identification of paste targets may further be accomplished by identifying edit controls or other user interface elements that are denoted as being paste targets, including through the use of techniques such as identifying characteristics like the use of the HTML "class" attribute as described above. In the specific example of Internet Explorer, and also possibly applied to a variety of other applications, a representation of the content displayed by the web browser control or the like may be retrieved in some fashion and then examined for the presence of paste targets. At least some implementations of Internet Explorer, and also some other applications, provide access to the information they display using one or more "accessibility interfaces." (Such interfaces are so named because they are often used to provide access to applications, data, or the like to individuals with disabilities, such as with the use of "screen reader" applications for those that cannot see a user interface.) In the specific example of Internet Explorer, the implementation of an accessibility interface may in some cases provide access to a computer-readable representation of the HTML page or other displayed content. Such a representation may then be examined for the presence of paste targets. For example, using an accessibility interface, it may be possible to enumerate all of the edit controls in a particular HTML page and identify the edit controls that have a particular value for the HTML "class" attribute.

The manner in which notifications of the initiation of paste operations may be received also depends on a variety of characteristics, including the nature of the destination applications, the operating system in use, and the functionality associated with the clipboard system. In many implementations, one or more of a variety of APIs may be provided that enable executable code to be called, or "called back," when a particular operation or event occurs. For example, an API might exist and be used that enables a particular piece of executable code to be called or executed when a paste operation is initiated with one or more paste targets, edit controls, or the like. Using such an API, or a different API, some implementations of this operation may be able to specify executable code that will be called when a paste is initiated for a paste target.

In one or more exemplary implementations of operation 115, an adapter application or other executable code may register or otherwise configure itself or other code to be notified or gain knowledge of new paste targets that enable access to richer data. That is, some implementations of the already described operation 110 may identify existing paste targets, while some implementations of operation 115 may be related to registering to be notified when new paste targets—targets that may not have existed when the operation 110 was executed—are created or come into existence. When one or more of such new paste targets come into existence, the adapter or other application may then register to be notified when a paste operation is initiated using the new paste targets. Such registration for notification of paste operation initiation may in some implementations be accomplished in a similar fashion to that described previously with reference to the operation 110. For example, in some implementations of this operation, an adapter or other application may register—perhaps using an API provided by the operating system or windowing environment—to be notified when any new applications, windows, or other relevant elements are created. Upon being notified, the adapter application may then examine the new element and find any paste targets that are to enable access to richer data. If any paste targets are found, the adapter application or other entity may then register to be notified of when any paste operations associated with those paste targets are initiated.

In an exemplary implementation of operation 120, a copy (or cut) operation (or some other clipboard operation) may place data on the clipboard. Such data may be referred to in some instances as "source data," because it originates with a "source application." The addition or transfer of data to the clipboard may be implemented in a variety of ways and may in at least some implementations be exactly the same whether access to richer data is being provided as described herein or not. That is, in at least some implementations this operation may simply be a copy or cut operation like any copy or cut operation: after the operation has completed, source data from the source application may exist on the clipboard. As described previously, such source data may be associated with one (or in some cases more than one) data item, and the information associated with each data item may be represented in one or more data formats.

It should be noted that, as used herein in the context of transferring information, the term "copy" may also include a "cut" operation, where the difference may be that data associated with a copy operation may remain in the location from which it is being copied. In contrast, data being "cut" may be removed, through some means, from the location from which it is being copied. In both copy and cut operations, data may be placed on the clipboard—the difference may be in what happens at the location from which the data is copied or cut. It should further be noted that in some implementations cut, copy, and paste operations, as well as data transfer operations that do not explicitly use system-provided cut, copy, or paste functionality, may be performed through multiple different user interface actions. For example, a user may initiate a copy operation using a "Copy" menu item, using a keyboard command like "Control-C," or some other command, and so on. In some embodiments, a user may also or instead employ one or more of a variety of other actions, such as "drag and drop" gestures, to transfer data. For example, a user may select, indicate, or otherwise identify some data to be transferred, copied, or cut by, say, selecting the data using computer mouse movements, and then initiate a data transfer, copy, or cut operation by "dragging" the selected entity or data to some other location—perhaps by clicking and holding a mouse button, and then finally "drop" the entity as part of the data transfer operation or to initiate a paste operation at the indicated location. As used herein, copy, cut, and paste operations should be considered to encompass any set of user actions or gestures, including those associated with such drag and drop implementations. It should also be further noted that, in some implementations, alternative user actions and gestures—including possibly drag and drop gestures—may be implemented without the use of system-provided cut, copy, and/or paste functionality. For example, a "drag" operation may not actually result in the execution of some or all of the same executable code associated with a copy or cut operation, and a drop operation may not result in the execution of some or all of the same executable code as a paste operation. Nonetheless, such systems may still use the techniques described herein. As a result, as just one example, a drop operation might result in the providing of generated or converted data in a way that is the same as or similar to the manner in which a paste operation might result in the providing of generated or converted data.

Continuing with a description of the exemplary operations, in one or more exemplary implementations of operation 125, a paste operation may be initiated in a destination application. Generally, such a paste operation may be associated with a paste target like those described previously, and may be initiated in one or more of a variety of fashions, including through the use of a menu item, a keyboard shortcut, a drag and drop operation, and so on.

As part of initiating a paste operation, in some implementations a user or other entity may select or otherwise indicate a particular paste target. The selection of the paste target might be performed in a variety of ways, depending, among other things, on how the paste target is implemented and the desired user experience. In one example, if the paste target comprises an edit control, a user may select the edit control. In another example, a user might select a control that is associated with an HTML "div" element by selecting a visible representation of the control—like perhaps an image associated with the "div" element—using a mouse, or using the keyboard perhaps by using a "TAB" key to move the focus between different controls or user interface elements. In yet other examples, a paste target may be selected or indicated in a variety of other ways.

Then, to actually initiate a paste operation, the user or entity may take some action that in some implementations is related to an edit control associated with the paste target. That is, for example, as the edit control may provide paste functionality, or may be associated with paste functionality provided by the application or provided elsewhere, the initiation of the paste operation may use the edit control. For example, in at least some cases where the edit control is associated with an HTML "textarea" or text "input" control, the user may initiate a paste operation by right or left clicking the control and choosing a paste menu item from a resulting pop-up menu. In such an example, the pop-up menu may in some implementations be provided by the edit control. In the same or other cases, a user might use a keyboard command like "Control-V" or use a general top-level application paste menu item. As the edit control may not be visible, it may appear, and the user may believe, that the interaction is with a visible representation associated with the selected control even though the actual interaction may be with the edit control itself. For example, in a case where an edit control is not visible and is located in the same physical location as an image, the user may believe that they are interacting with the image, not with the not visible edit control. Such an arrangement—with a not visible edit control providing paste functionality and a visible representation with which the user appears to interact—may be used in a variety of scenarios, including with web pages displayed by a web browser. Edit controls used in non-web browser contexts may operate the same or in a similar fashion, or may operate differently.

In an exemplary implementation of operation 130, a paste notification may be received as a result of the paste operation that was initiated in operation 125 and also possibly as a result of the registration for paste notification that was accomplished in one or more of operation 110 and operation 115. In some implementations, this operation may result in the execution of callback or other code in an adapter or other application, and such code may also execute or use operation 135 and operation 140, as described below.

In one or more implementations of operation 135, destination data may be generated using at least some of the source data that exists on the clipboard. Generally, the destination data may then—as a result of one or more subsequent operations—be provided or used by the destination application in which the paste operation was initiated. The nature of the source data used and the extent and format of the destination data may vary widely, and may generally encompass some or all of the source data (including possibly multiple data formats associated with a particular or each data item), and may produce destination data in one or more of a variety of formats. As just one example, an implementation of this operation might identify a data item on the clipboard as including— as introduced previously—a reference to an ICS file, where the file contains contact information in the iCalendar format. This implementation might then create the corresponding Live Clipboard XML data that represents the same or similar information that exists in the ICS file, perhaps by, say, converting the iCalendar data to the hCard format, and then encapsulating the hCard data in Live Clipboard XML. In the same or other implementations of course, a variety of other source data might be used, and a variety of other destination data in a variety of formats might be produced. In some implementations, including those where the destination application may be configured to use text data and those that use data in the Live Clipboard format or other XML or text format, the destination data may comprise text.

In some implementations, this operation may be implemented, at least in part, using an extensibility system. Such a system might, for example, enable users or other entities to "plug in" executable code or other instructions that specify, for example, how to convert particular source data to particular destination data. Using such a system, the source and destination data that an implementation of operation 135 may interpret or generate may be extended or changed without changing an adapter or other application that provides an implementation of operation 135. As just one example, when a new source application or source data format is introduced or becomes common, a plug in may be provided that can convert from the new source data format and produce destination data in some other format.

In an exemplary implementation of operation 140, the destination data generated in operation 135 may be provided to the destination application in which the paste operation was initiated. This operation may be implemented in a variety of ways depending on characteristics such as the manner in which the destination application is implemented and the functionality available to the adapter application or other executable code associated with operation 140. For example, in some implementations of operation 140, the adapter application or other executable code may be able to programmatically change the contents of the edit control or paste target associated with the paste operation initiated in operation 125. For example, as part of the paste notification received in operation 130, or perhaps part of the paste target identification accomplished in operation 110 or operation 115, a "handle" or other identifier associated with the paste target or some element associated with the paste target—such as an edit control—may have been provided or have been accessible. Using this handle or identifier, executable code that implements at least part of operation 140 may be able to call a "Set Text" function, or the like, and provide the destination data. (In the case of a "Set Text" function, the destination data most likely would be provided as text.) For example, in the specific case where the paste target in the destination application is configured to understand and interpret information in the Live Clipboard format, the destination data provided using the "Set Text" or other function may be XML text that conforms to the Live Clipboard format. As a result of this operation, the destination data may now be accessible to the destination application—for example, if the destination data was set to be the text of an edit control that is part of the destination application, the destination application may be able to access the destination data by reading the contents of the edit control's text property, or the like.

Finally, in an implementation of operation 145, the destination application may use the destination data it received as part of operation 140 in one or more ways, including by updating a user interface, by processing the data in one or more of a variety of ways, by storing the data, and so on. As just one example, a web page that includes a paste target and that can interpret Live Clipboard data might examine the destination data and, if it is Live Clipboard data that includes information understood or associated with the page—perhaps the page displays contacts and the Live Clipboard data includes an hCard representation of a contact—might execute code that retrieves relevant data from the Live Clipboard representation and uses it to update the user interface associated with the page. Executable code in the destination application may be configured to be called when the text associated with a paste target—perhaps the text associated with an edit control—is changed, perhaps by subscribing or registering to be called when a "Text Change" event, or the like, is fired or occurs; may poll the paste target or other repository of destination data and take action when the data associated with the paste target changes; or may identify when to use the destination in a variety of other ways.

Figure 2:
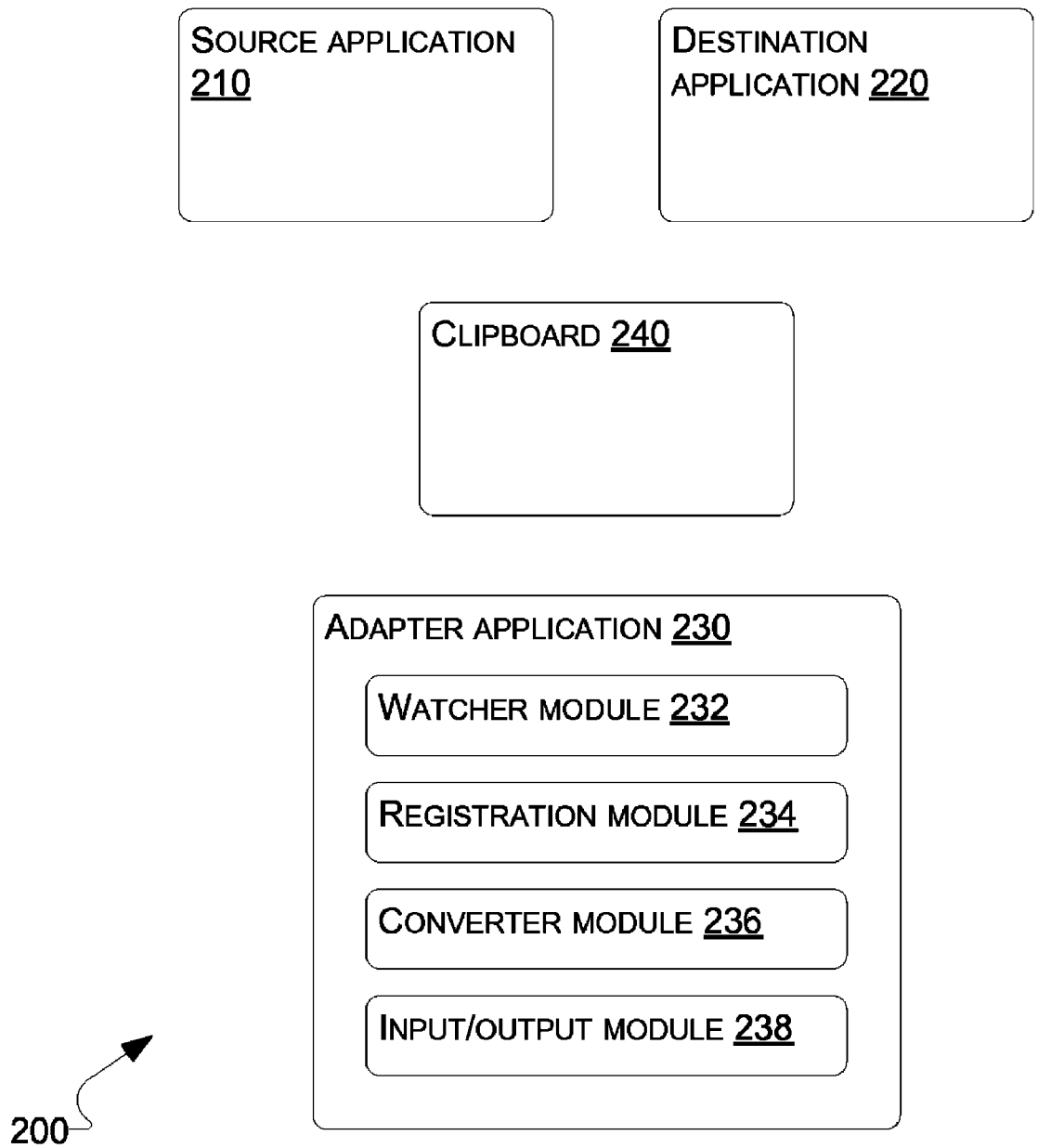
FIG. 2 illustrates an exemplary system that demonstrates one manner in which access to richer data may be enabled by an adapter application.

Turning now to FIG. 2, shown therein is an exemplary system 200 that demonstrates one manner in which access to richer data may be enabled by an adapter application. The system includes a source application 210, a destination application 220, an adapter application 230, and a clipboard 240. The adapter application in turn is shown as including a watcher module 232, a registration module 234, a converter module 236, and an input/output module 238. This description of FIG. 2 may be made with reference to other figures. However, it should be understood that the elements described with reference to FIG. 2 are not intended to be limited to being used with the elements described with reference to other figures. In addition, while the exemplary diagram in FIG. 2 indicates particular elements, in some implementations not all of these elements may exist, and in some implementations additional elements may exist. Furthermore, it should be understood that the exemplary graphical representations of the systems and user interfaces shown in FIG. 2, and in other figures included herein, are provided only for purposes of discussion, and in no way should be construed as limiting the scope of the techniques described herein to any particular graphical or other representation.

Generally the source application 210, the destination application 220, and the adapter application 230 may be one or more applications, web pages hosted in a web browser or other application host, or other executable code as introduced previously and described elsewhere herein or that are evident to one of skill in the art, while the clipboard 240 may be a clipboard system that enables information to be exchanged between applications and other entities, also as introduced elsewhere herein and known in the art. Some or all of the operations previously described with reference to FIG. 1 may in some implementations be associated with the source application, the destination application, the adapter application, and the clipboard.

Generally, the source application 210 may be considered to provide or be associated with source data placed on the clipboard 240 while the destination application 220 may include one or more paste targets that may ultimately include or have access to destination data generated or provided by the adapter application 230, as described in more detail below and also with reference to the operations of FIG. 1. For example, the copying of source data to the clipboard operation 120 described previously with reference to FIG. 1 may in some cases take place in or be associated with the source application, while the paste initiation operation 125 and/or the use of destination data operation 145 may in some implementations take place in or be associated with a destination application.

The adapter application 230 may in some implementations exist as an application that might run transparently or "in the background" and provide access to richer data in applications with appropriately configured paste targets. The watcher module 232 may include functionality associated with the detection of new paste targets including identifying new paste targets using steps as described previously with reference to, for example, operation 115 of FIG. 1. The registration module 234 may include functionality such as that associated with identifying a paste target, registering the adapter application to be notified when a paste operation using a paste target is initiated, and may include functionality associated with, for example, operation 110 of FIG. 1. The converter module 236 may include functionality associated with converting source data to destination data, including in some implementations an extensibility or "plug-in" system and functionality associated with, for example, operation 135 of FIG. 1. Finally, the input/output module 238 may include functionality associated with, for example, receiving a paste notification when a paste operation is initiated, including in manners such as those described previously with reference to, for example, operation 130 of FIG. 1. The input/output module may also or instead include functionality associated with providing generated data, including in some implementations data generated by the converter module, to the destination application, including functionality associated with, for example, operation 140 of FIG. 1.

In some implementations an adapter application 230 may be written or implemented so that the execution of the adapter application and the functionality it provides does not require elevated privileges, such as "administrator" or "root" access. Such an application may then in some cases be installed and/or used by a wider variety of users.

It should be noted that while the source application 210, the destination application 220, and the adapter application 230 are shown in the exemplary system 200 as being separate applications that might exist in a single computer system, that the applications may in fact exist as part of fewer than three separate applications, and might exist as part of multiple different computer systems, as long as the computer systems are able to communicate data placed on a clipboard between the different computer systems. In addition, while the source application 210 and destination application 220 are shown as being separate applications, in some implementations source and destination functionality may be implemented as part of the same application, same web page, or related web pages, and the like.

Figure 3:
FIG. 3 illustrates an exemplary system that includes a graphical example of one mechanism for representing clipboard data, including a representation of data that might exist as destination data or might be provided to a destination application.

Turning now to FIG. 3, shown therein is an exemplary system 300 that includes a graphical example of one mechanism for representing clipboard data, including a representation of data that might exist as destination data or might be provided to a destination application. The exemplary system may contain clipboard data 310, structured data 320, feed data 350, presentation data 380, and other data 395. Any or all of the structured data, feed data, presentation data, and other data may include references in at least some implementations. Structured data may be associated with one or more structured data formats, such as structured data format 1 330 and structured data format N 332. A structured data format may contain one or more items, such as item 1 334 and item N 336. Feed data may be associated with feeds like feed 1 360 and feed N 362, while a feed may be associated with some number of sets of feed items, such as feed items 1 364 and feed items N 368. A set of feed items, like feed items 1 364, may be associated with some number of feed items, like feed item 1 366 and feed item N 367. Finally, presentation data 380 may be associated with one or more presentation formats, like presentation format 1 390 and presentation format N 392. This description of FIG. 3 may be made with reference to other figures. However, it should be understood that the elements described with reference to FIG. 3 are not intended to be limited to being used with the elements described with reference to other figures. In addition, while the exemplary diagram in FIG. 3 indicates particular elements, in some implementations not all of these elements may exist, and in some implementations additional elements may exist.

Clipboard data, including destination data perhaps generated by an adapter application or the like, may be represented in a wide variety of formats. In some implementations, clipboard data may include some structured representation of the data itself (which may itself include references to additional data), feed or subscription information associated with a reference to additional data and about the structured data or about other data, and additional presentation or display representations of the structured data. In general, the term "clipboard data" may be interpreted to refer to destination data, including data generated by an adapter application or as part of a generate destination data operation, as described elsewhere herein.

In some implementations, clipboard data, such as the clipboard data 310, may be represented using a markup language, like XML, for example, or some other representation. It should be noted that while the system 300 and the clipboard data 310 may be described herein with reference to XML elements, XML attributes, and so on, the use of XML is not required and any description of such use herein is provided for exemplary purposes only. The clipboard data may be represented in any number of a wide variety of alternate formats. Furthermore, while particular elements, attributes, and so on, may be referred to for exemplary purposes using a particular name, such elements, attributes, and so on, may be referred to using any name.

In some implementations, the clipboard data 310 may contain header information as well as one or more of different types of data, including the actual structured data, feed data, and presentation data. In general each of these types of data may refer to the same information, but in different formats. One purpose of providing multiple formats in this manner may be to make it more likely that a destination may find data appropriate for its use.

When represented using a markup language, perhaps like XML, the structure of the clipboard data 310 might be the same as or similar to the following:

```
<liveclipboard>
    <lc:data>                 0 or 1 elements
        <lc:format>           1 or more elements
            <lc:item/>        1 or more elements
        </lc:format>
    </lc:data>
    <lc:feeds>                0 or 1 elements
        <lc:feed>             1 or more elements
            <lc:feeditems>    0 or 1 elements
                <lc:feeditem> 0 or more elements
            </lc:feeditems>
        </lc:feed/>
    </lc:feeds>
    <lc:presentations>        0 or 1 elements
        <lc:format/>          1 or more elements
    </lc:presentations>
</liveclipboard>
```

In some implementations, the "liveclipboard" element may be associated with the clipboard data 310, and the "data", "feeds", and "presentations" elements, and their child elements, may be associated, respectively, with the structured data 320, feed data 350, and presentation data 380, and their child elements, as described with reference to FIG. 3. In addition, in this example data, the use of the string "lc:" might indicate a particular XML namespace, perhaps including a namespace related to transferring structured data or destination data using a clipboard as described herein.

In some cases, header or other information may be associated with the clipboard data 310. This data may be associated with some or all of "version", "source", and "description" attributes, as well as other attributes. The "version" attribute may represent the version of the clipboard data format used in a particular instance of the clipboard data. The "source" attribute may represent a reference, like a URL, to the source provider of the clipboard data content. And the "description" attribute may represent a human readable description of clipboard data content.

In some implementations, the clipboard data may be associated with at least one of structured data 320, feed data 350, and presentation data 380. In the same or other implementations, the clipboard data may be associated with more than one of these elements, including some implementations where all three of the elements, or possibly other elements, may be included.

The first set of data that may be included is the structured data itself, which, in some implementations, may be associated with the structured data 320. In the same or other implementations the structured data 320 may be associated with data represented using defined data formats, such as hCard and vCard for representing contact information, hCal and iCalendar for representing event information, and so on. However, any defined format or structured data may be used or associated with the structured data 320.

When the clipboard data 310 contains structured data 320, it may be represented, for example, in a manner similar to or the same as the following:

```
<lc:data>             0 or 1 elements
    <lc:format>       1 or more elements
        <lc:item/>    1 or more elements
    </lc:format>
</lc:data>
```

When represented like this, the "format" element may correspond to the structured data format 1 330 and the structured data format N 332, while the "item" element may correspond to the item 1 334 and the item N 336.

A structured data format, like structured data format 1 330, may define the format of the child "item" elements, like item 1 334 and item N 336, with which it is associated. A structured data format may be associated with some or all of the "contenttype", "type", and "encoding" attributes, as well as other attributes. The "contenttype" attribute may represent the content type of data for the contained "item" elements. For example, this attribute may contain data defined by the Internet Assigned Names Association (IANA), like "text/calendar", "application/xhtml+mL", and so on. The "type" attribute may represent a schema or format type of the data for the contained "item" elements. This may be useful, for example, if an IANA format identifier provided may not be sufficient to completely determine the type. For example, when the "contenttype" attribute has a value of "text/calendar" there may be sufficient information to determine that the data associated with an "item" element is formatted using the iCal standard. In contrast, when the "contenttype" attribute has a value such as "application/xhtml+xml", additional information may be necessary to determine the format of the data in the "item" element. For example, in this case, the "type" attribute might have a value of "vevent", which might indicate that the data is formatted using the hCal standard. Finally, an "encoding" attribute may represent how the data associated with the "item" elements is encoded.

In some implementations, when multiple formats are provided, such as with multiple instances of structured data format 1 330 and structured data format N 332, it may be useful to order the formats in some fashion. For example, "higher fidelity" formats—formats that may provide more data, for example—might be ordered before "lower fidelity" formats that do not provide as much data. (Lower fidelity formats may be more widely accepted by destinations, and so still may be preferable for some uses, or for some applications, web pages, and so on.)

After the format of the data is defined, for example, using a structured data format, like structured data format 1 330, one or more items that are represented using that format may be provided. These items may correspond, for example, to the item 1 334 and item N 336. In some representations, these items may be associated with "item" elements that are perhaps located as children of "data" and "format" elements.

An "item" may represent data itself and may be associated with some or all of "description" and "ref" attributes, as well as other attributes. The "description" attribute may represent additional data defined by the user or application. The "ref" attribute may contain a reference, for example a URL, associated with the item.

The "item" element may also contain data itself. For example, when using XML, if the data can be represented as well-formed XML data that uses, say, the UTF-8 encoding, then the XML corresponding to the data may be appended as a child of the "item" element. In some other cases, for example when the data may not be represented as well-formed UTF-8 XML data, the data may reside in a CDATA section for the "item" element, optionally encoded in the format described by the "encoding" attribute of the enclosing "format" element.

Data associated with either or both of the "format" and "item" elements may include both "by-value" and "by-reference" data. That is, the actual data itself may be included, for example, in the "item" element. Alternatively, or in addition to the actual data, a reference to the data or to additional data may be included. That is, an "item reference" may be included in the data for a structured data item. In some implementations, for example, the reference to the data may be stored using the previously introduced "ref" attribute. For example, in an item that contains information about a single contact or person, a by-value copy of the data might be provided as part of the "item" element itself, and a reference to that contact—perhaps as a URL—might be provided using the "ref" attribute of the "item" element. In some cases, for a particular item, only by-value data may be provided, while in other cases only by-reference data may be provided, and while in yet other cases, both by-value and by-reference data may be provided.

In some implementations, when there are multiple structured data formats, the ordering of items beneath each format may indicate how items correspond to each other. For example, if clipboard data 310 includes two structured data formats X and Y, corresponding in some implementations to two "format" elements, the first "item" element of format X may correspond to the first "item" element of format Y. That is, the first "item" element for each format may refer to the same item, but represented in different formats. Furthermore, in some implementations, when feed data—discussed in more detail below—exists, including feed data that includes feed items, the ordering of "item" elements may correspond to the ordering of "feeditem" elements, which may enable the correspondence of items to their location in a feed.

As just one example, suppose that the clipboard data includes contact information for a particular contact, and that the contact information itself is represented using the hCard standard. In such an example, the contact information itself may be represented as follows:

```
<div class='vcard'>
    <span class='fn n'>
        <span class='given-name'>John</span>
        <span class='family-name'>Doe</span>
    </span>
    <div class='adr'>
        <span class='type'>work</span> address:
        <span class='street-address'>1 Microsoft Way</span>,
        <span class='locality'>Redmond</span>,
        <span class='region'>WA</span>
        <span class='postal-code'>98052</span>
    </div>
    <div class='tel'>
        <span class='type'>work</span>
        <abbr class='type' title='voice'> phone: </abbr>
        <span class='value'>+1-425-555-1212</span>
    </div>
</div>
```

A corresponding clipboard data representation might consist of the following data:

```
<?xml version="1.0" encoding="utf-8"?>
<liveclipboard version="0.92"
xmlns:lc="http://www.microsoft.com/schemas/liveclipboard">
    <lc:data>
        <lc:format type="vcard"
contenttype="application/xhtml+xml">
            <lc:item>
                <div class='vcard'>
                    <span class='fn n'>
                        <span class='given-name'>John</span>
                        <span class='family-name'>Doe</span>
                    </span>
                    <div class='adr'>
```

-continued

```
                        <span class='type'>work</span> address:
                        <span class='street-address'>1 Microsoft Way</span>,
                        <span class='locality'>Redmond</span>,
                        <span class='region'>WA</span>
                        <span class='postal-code'> 98052</span>
                    </div>
                    <div class='tel'>
                        <span class='type'>work</span>
                        <abbr class='type' title='voice'> phone: </abbr>
                        <span class='value'>+1-978-555-1212</span>
                    </div>
                </div>
            </lc:item>
        </lc:format>
    </lc:data>
</liveclipboard>
```

As another example, suppose that two contacts—each represented using hCard—are to be represented as clipboard data. The contacts themselves might be represented as follows:

```
<div class='vcard'>
    <span class='fn n'>
        <span class='given-name'>John</span>
        <span class='family-name'>Doe</span>
    </span>
    <div class='adr'>
        <span class='type'>work</span> address:
        <span class='street-address'>1 Microsoft Way</span>,
        <span class='locality'>Redmond</span>,
        <span class='region'>WA</span>
        <span class='postal-code'>98052</span>
    </div>
    <div class='tel'>
        <span class='type'>work</span>
        <abbr class='type' title='voice'> phone: </abbr>
        <span class='value'>+1-425-555-1212</span>
    </div>
</div>
<div class='vcard'>
    <span class='fn n'>
        <span class='given-name'>George</span>
        <span class='family-name'>Doe</span>
    </span>
    <div class='adr'>
        <span class='type'>work</span> address:
        <span class='street-address'>1 Microsoft Way</span>,
        <span class='locality'>Redmond</span>,
        <span class='region'>WA</span>
        <span class='postal-code'>98052</span>
    </div>
    <div class='tel'>
        <span class='type'>work</span>
        <abbr class='type' title='voice'> phone: </abbr>
        <span class='value'>+1-425-555-1212</span>
    </div>
</div>
```

And the corresponding clipboard data representation might be as follows:

```
<?xml version="1.0" encoding="utf-8"?>
<liveclipboard version="0.92"
xmlns:lc="http://www.microsoft.com/schemas/liveclipboard">
    <lc:data>
        <lc:format type="vcard"
contenttype="application/xhtml+xml">
            <lc:item>
                <div class='vcard'>
                    <span class='fn n'>
```

-continued

```
        <span class='given-name'>John</span>
        <span class='family-name'>Doe</span>
      </span>
      <div class='adr'>
        <span class='type'>work</span> address:
        <span class='street-address'>1 Microsoft Way</span>,
        <span class='locality'>Redmond</span>,
        <span class='region'>WA</span>
        <span class='postal-code'> 98052</span>
      </div>
      <div class='tel'>
        <span class='type'>work</span>
        <abbr class='type' title='voice'> phone: </abbr>
        <span class='value'>+1-978-555-1212</span>
      </div>
    </div>
  </lc:item>
  <lc:item>
    <div class='vcard'>
      <span class='fn n'>
        <span class='given-name'>George</span>
        <span class='family-name'>Doe</span>
      </span>
      <div class='adr'>
        <span class='type'>work</span> address:
        <span class='street-address'>1 Microsoft Way</span>,
        <span class='locality'>Redmond</span>,
        <span class='region'>WA</span>
        <span class='postal-code'> 98052</span>
      </div>
      <div class='tel'>
        <span class='type'>work</span>
        <abbr class='type' title='voice'> phone: </abbr>
        <span class='value'>+1-978-555-1212</span>
      </div>
    </div>
  </lc:item>
 </lc:format>
 </lc:data>
</liveclipboard>
```

As discussed previously, the clipboard data may include alternate representations or formats for a single item. As one example, suppose that an event may be represented using both the iCalendar and hCal standards. With such an example, the iCalendar data might be like the following:

```
BEGIN:VCALENDAR
METHOD:PUBLISH
VERSION:2.0
BEGIN:VEVENT
URL:http://www.microsoft.com/events/E1-001-000629872-2
DTSTART:20060208T180000
DTEND:20060208T180000
DTSTAMP:20060119T184157Z
SUMMARY:The Bellevue Vegetarian February Meetup
DESCRIPTION:Let's all get together and meet over a great
veggie dinner at Teapot Vegetarian House in Redmond!
UID:E1-001-000629872-2
LOCATION:Bellevue\,Washington 98004
END:VEVENT
END:VCALENDAR
```

In the same example, the corresponding hCal data might be like the following:

```
<div class='vevent'>
  <a class='url' href='http://www.microsoft.com/events/E1-001-000629872-2'>
    <span class='summary'>The Bellevue Vegetarian February Meetup</span>
  </a>
  <div class='description'>Let's all get together and meet over a great veggie dinner at Teapot Vegetarian House in Redmond!</div>
  <div>Start Date: <abbr class='dtstart' title='20060208T180000'>February 8, 2006</abbr></div>
  <div>End Date: <abbr class='dtend' title='20060208T180000'>February 8, 2006</abbr></div>
  <div>Location: <span class='location'>Bellevue,Washington 98004</span></div>
  <div>UID: <span class='uid'>E1-001-000629872-2</span></div>
  <div>Last Updated: <abbr class='dtstamp' title='20060119T184157Z'>January 19, 2006</abbr></div>
</div>
```

Both of these formats might be represented in clipboard data in a manner similar to or the same as the following:

```
<?xml version="1.0" encoding="utf-8" ?>
<liveclipboard version="0.92"
xmlns:lc="http://www.microsoft.com/schemas/liveclipboard">
  <lc:data>
    <lc:format type="vcalendar" contenttype="application/xhtml+xml">
      <lc:item>
        <div class='vevent'>
          <a class='url' href='http://www.microsoft.com/events/E1-001-000629872-2'>
            <span class='summary'>The Bellevue Vegetarian February Meetup</span>
          </a>
          <div class='description'>Let's all get together and meet over a great veggie dinner at Teapot Vegetarian House in Redmond!</div>
          <div>Start Date: <abbr class='dtstart' title='20060208T180000'>February 8, 2006</abbr></div>
          <div>End Date: <abbr class='dtend' title='20060208T180000'>February 8, 2006</abbr></div>
          <div>Location: <span class='location'>Bellevue,Washington 98004</span></div>
          <div>UID: <span class='uid'>E1-001-000629872-2</span></div>
          <div>Last Updated: <abbr class='dtstamp' title='20060119T184157Z'>January 19, 2006</abbr></div>
        </div>
      </lc:item>
    </lc:format>
    <lc:format contenttype="text/calendar">
      <lc:item>
        <![CDATA[
BEGIN:VCALENDAR
METHOD:PUBLISH
VERSION:2.0
BEGIN:VEVENT
URL:http://www.microsoft.com/events/E1-001-000629872-2
DTSTART:20060208T180000
DTEND:20060208T180000
DTSTAMP:20060119T184157Z
SUMMARY:The Bellevue Vegetarian February Meetup
DESCRIPTION:Let's all get together and meet over a great veggie dinner at Teapot Vegetarian House in Redmond!
UID:E1-001-000629872-2
LOCATION:Bellevue\,Washington 98004
END:VEVENT
END:VCALENDAR
]]>
      </lc:item>
    </lc:format>
  </lc:data>
</liveclipboard>
```

Some clipboard data representations may be associated with subscription or feed information that may be, in some implementations, associated with the feed data 350. Such information may be useful, for example, to transfer references to data, to represent feeds or sequences of data, enable subscriptions to data or feeds, and so on. In one example, item data may be provided using, for example, the structured data 320, and information about a feed that may be used to update the item data may be provided using the feed data 350. For example, an initial set of contacts or contact information might be provided using the structured data 320, and information in the feed data 350 may be provided to enable an application to later update the contacts initially provided using the structured data. In another example, the feed data may refer to some other data or information—that is, for example, the feed data may refer to data that is not transferred in the structured data 320. For example, the feed data may refer to one or more RSS, Atom, or other feeds that contain additional or other information. The information referred to by the feed data may be related to or associated with the data included elsewhere in the transfer or clipboard data representation—such as with updating contact information as previously introduced—or may refer to data that is not included or associated with the transfer or clipboard data representation. Note also that references may be represented and communicated in other fashions that do not use feed references in feed data. For example, a reference might be represented as an item reference in a structured data item.

Feed data may be represented in multiple ways, including, for example, in a manner similar to the following:

```
<lc:feeds>              0 or 1 elements
    <lc:feed>           1 or more elements
        <lc:feeditems>  0 or 1 elements
            <lc:feeditem>   0 or more elements
        </lc:feeditems>
    </lc:feed/>
</lc:feeds>
```

When represented like this, the "feeds" element may correspond to the feed data 350, the "feed" element may correspond to the feed 1 360 and feed N 362, the "feeditems" element may correspond to the feed items 1 364 and feed items N 368, and the "feeditem" element may correspond to the feed item 366 and feed item N 367.

A feed, like feed 1 360 and feed N 362, may have associated information about the feed. A feed may be associated with some or all of the "type", "ref", "description", and "authtype" attributes, as well as other attributes. The "type" attribute may represent the type of data that exists at the location specified, for example, by the "ref" attribute. For example, the "type" attribute may include values such as "RSS", "Atom", and so on, or other values. Generally, a wide variety of feed types may be used, depending upon, for example, the capabilities of the endpoints. For example, some implementations may support RSS, other implementations may support RSS and also support extensions to RSS to implement other functionality, and so on. For example, some endpoints may support "Simple Sharing Extensions" to enable bi-directional synchronization of data using RSS or other feed types. The "ref" attribute may represent a specific reference or address associated with the feed, like a URL. In some implementations, this reference may be the location of the feed itself. The "description" may represent some user-specified data associated with the feed. Finally, the "authtype" attribute may represent some type of authentication technique or techniques that may or must be used when accessing the feed.

Each feed may contain some number of sets of feed items, such as feed items 1 364 and feed items N 368. These may be represented in some cases by one or more "feeditems" elements. In turn, a set of feed items may contain some number of feed items, which might be represented using "feeditem" elements.

A set of feed items may be associated with the "contenttype", "type", and "xpath" attributes, as well as other attributes. The "contenttype" attribute may represent the content type of data for the contained "feeditem" elements. For example, similar to the structured data, this attribute may contain data defined by IANA, like "text/calendar", "application/xhtml+xml", and so on. The "type" attribute may represent a schema or format type of the data for the contained "feeditem" elements. This may be useful, like before and for example, if an IANA format identifier provided may not be sufficient to completely determine the type. For example, when the "contenttype" attribute has a value of "text/calendar" there may be sufficient information to determine that the data associated with a "feeditem" element is formatted using the iCalendar standard. In contrast, when the "contenttype" attribute has a value such as "application/xhtml+xml", additional information may be necessary to determine the format of the data in the "feeditem" element. For example, in this case, the "type" attribute might have a value of "vevent", which might indicate that the data is formatted using the hCal standard.

The "xpath" attribute may represent a query—perhaps using the XPath standard, but also represented using some other query language or standard—that returns or otherwise identifies data items from the feed. For example, if a feed is retrieved using the "ref" attribute of the parent "feed" element, in some cases the query represented by the "xpath" attribute may be executed against the contents of the retrieved feed to identify particular data items in the feed. This may enable the feed to contain a variety of data, only some of which may be relevant for or associated with the clipboard data, and still enable the clipboard data to be associated directly with the relevant data. In addition, this may enable the relevant portions of the data to be changed, perhaps at some later time, by only changing the value of this attribute; the actual data in the feed would not necessarily need to change. In implementations that do not use the "xpath" attribute, or a similar type of attribute or query, all of the data associated with the feed may be relevant to, for example, a subsequent update or data retrieval operation.

Similar to with the structured data discussed previously, in some implementations, when multiple formats are provided, it may be useful to order the formats in some fashion. For example, higher fidelity formats—again, formats that may provide more data, for example—might be ordered before lower fidelity formats that do not provide as much data. As before, lower fidelity formats may be more widely accepted, and so still may be preferable for some uses, or for some applications, web pages, and so on.

A set of feed items may in turn be associated with or contain some number of "feeditem" elements, which may in some cases, enable information retrieved from the feed to be linked to "item" elements provided, for example, in the structured data 320. A "feeditem" element may be associated with an "id" attribute, or some other attribute or data, which may represent some type of identifier, perhaps a unique identifier, for the feed item. In implementations that do not use or include elements like the "feeditem" element, data may still be retrieved and used, but in some cases the data may not be linked to the structured data also provided with the clipboard data.

In at least some implementations, if there are multiple instances of feeds, like feed 1 360 and feed N 362, the ordering of "feeditem" elements beneath each feed may indicate that particular items correspond to each other. For example, in the case where there are two "feed" elements named X and Y, the first "feeditem" element associated with "feed" X may correspond to the first "feeditem" element associated with "feed" Y. Also, in clipboard data that has structured data 320, the ordering of "feeditem" elements may correspond to the ordering of "item" elements provided in the structured data 320.

An example clipboard data representation that uses feed data 350 is provided below, after the discussion of presentation data.

Finally, some clipboard data representations may be associated with presentation data, such as presentation data 380 and presentation format 1 390 and presentation format N 392. Such data may provide a formatted or display representation of data that may also be provided elsewhere in the clipboard data. For example, where the structured data 320 includes a contact, perhaps in the hCard or vCard formats, the presentation data may be associated with an instance of the same contact data represented using HTML, JPEG, or some other presentation data format. In many cases destination applications, web pages, or the like, that do not understand data in one or more structured data formats may still understand a display representation, like HTML or JPEG, and so may still be able to at least display or present the clipboard data.

Presentation may be represented in multiple ways, including, for example, in a manner similar to the following:

```
<lc:presentations>    0 or 1 elements
    <lc:format/>      1 or more elements
</lc:presentations>
```

When represented like this, the "presentations" element may correspond to the presentation data 380, and the "format" element may correspond to the presentation format 1 390 and presentation format N 392.

The presentation data 380 may be associated with some number of presentation formats. Each presentation format, perhaps represented by a "format" element, may be associated with some or all of the "contenttype", "type", "encoding", "description", and "ref" attributes, as well as other attributes. The "contenttype" attribute may represent the content type of data, for example, for a CDATA section associated with this format. For example, this attribute may contain data defined by IANA, like "application/xhtml+xml", and the like. The "type" attribute may represent a schema or format type of the data for the format. Like before, this may be useful, for example, if an IANA format identifier provided may not be sufficient to completely determine the type. The "encoding" attribute may represent how the data associated with, for example, a CDATA section is encoded. The "description" attribute may represent data defined by the user or application. Finally, the "ref" attribute may contain a reference, for example a URL, associated with the item.

Similar to with structured data, a "format" element may also contain data itself. For example, when using XML, if the data can be represented as well-formed XML data that uses the UTF-8 encoding, then the XML corresponding to the data may be appended as a child of the "format" element. In some other cases, for example when the data may not be represented as well-formed UTF-8 XML data, the data may reside in a CDATA section for the "format" element, optionally encoded in the format described by the "encoding" attribute.

As just one example, suppose clipboard data or destination data is desired that represents contact information in the hCard format, an RSS feed associated with the contact information—so the contact information can be updated at some later point in time, for example—and an HTML representation of the contact data—perhaps useful, for example, if a destination of the clipboard data does not understand the hCard format.

With such an example, the hCard contact data might be represented as follows:

```
<div class='vcard'>
    <span class='fn n'>
        <span class='given-name'>John</span>
        <span class='family-name'>Doe</span>
    </span>
    <div class='adr'>
        <span class='type'>work</span> address:
        <span class='street-address'>1 Microsoft Way</span>,
        <span class='locality'>Redmond</span>,
        <span class='region'>WA</span>
        <span class='postal-code'>98052</span>
    </div>
    <div class='tel'>
        <span class='type'>work</span>
        <abbr class='type' title='voice'> phone: </abbr>
        <span class='value'>+1-425-555-1212</span>
    </div>
</div>
<div class='vcard'>
    <span class='fn n'>
        <span class='given-name'>George</span>
        <span class='family-name'>Doe</span>
    </span>
    <div class='adr'>
        <span class='type'>work</span> address:
        <span class='street-address'>1 Microsoft Way</span>,
        <span class='locality'>Redmond</span>,
        <span class='region'>WA</span>
        <span class='postal-code'>98052</span>
    </div>
    <div class='tel'>
        <span class='type'>work</span>
        <abbr class='type' title='voice'> phone: </abbr>
        <span class='value'>+1-425-555-1212</span>
    </div>
</div>
```

In the same example, the RSS data might be represented as follows:

```
<?xml version="1.0" encoding="utf-8" ?>
<rss version="2.0">
    <channel>
        <title>My Friends </title>
        <link>http://localhost/FriendsFeed.ashx</link>
        <pubDate>Wed, 15 Mar 2006 09:05:43 -0800</pubDate>
        <lastBuildDate>Wed, 15 Mar 2006 09:05:43 -0800</lastBuildDate>
        <item>
            <title>John Doe</title>
            <description>
                <![CDATA[
                    <div class='vcard'>
                        <span class='fn n'>
                            <span class='given-name'>John</span>
                            <span class='family-name'>Doe</span>
                        </span>
                        <div class='adr'>
                            <span class='type'>work</span> address:
                            <span class='street-address'>1 Microsoft Way</span>,
```

```
            <span class='locality'>Redmond</span>,
            <span class='region'>WA</span>
            <span class='postal-code'>98052</span>
          </div>
          <div class='tel'>
            <span class='type'>work</span>
            <abbr class='type' title='voice'> phone: </abbr>
            <span class='value'>+1-425-555-1212</span>
          </div>
        </div>
      ]]>
    </description>
    <enclosure
url="http://server/SIS/contact.vcf?puid=1688852012477191&ro
id=4EB2576478DA9846A06EFCC12FFC0185"/>
  </item>
  <item>
    <title>George Doe</title>
    <description>
      <![CDATA[
        <div class='vcard'>
          <span class='fn n'>
            <span class='given-name'>George</span>
            <span class='family-name'>Doe</span>
          </span>
          <div class='adr'>
            <span class='type'>work</span> address:
            <span class='street-address'>1 Microsoft Way</span>,
            <span class='locality'>Redmond</span>,
            <span class='region'>WA</span>
            <span class='postal-code'>98052</span>
          </div>
          <div class='tel'>
            <span class='type'>work</span>
            <abbr class='type' title='voice'> phone: </abbr>
            <span class='value'>+1-425-555-1212</span>
          </div>
        </div>
      ]]>
    </description>
    <enclosure url="
http://server/SIS/contact.vcf?puid=1688852012477191&roid=0B
69B846ED7E2241AE4F6773EA749183"/>
  </item>
  </channel>
</rss>
```

And in the same example, the HTML data for the contact information might be represented as follows:

```
<html>
  <body>
    <table>
      <tr>
        <th><b>Fullname</b></th>
        <th><b>Street Address</b></th>
        <th><b>City</b></th>
        <th><b>State</b></th>
        <th><b>Zip</b></th>
        <th><b>Phone</b></th>
      </tr>
      <tr>
        <td>John Doe</td>
        <td>1 Microsoft Way </td>
        <td>Redmond</td>
        <td>WA</td>
        <td>98052</td>
        <td>+1-425-555-1212</td>
      </tr>
      <tr>
        <td>George Doe</td>
        <td>1 Microsoft Way </td>
        <td>Redmond</td>
        <td>WA</td>
        <td>+1-425-555-1212</td>
      </tr>
    </table>
  </body>
</html>
```

Given all of these data representations, a corresponding clipboard data or destination data representation might consist of the following data:

```
<?xml version="1.0" encoding="utf-8" ?>
<liveclipboard version="0.92"
xmlns:lc="http://www.microsoft.com/schemas/liveclipboard">
  <lc:data>
    <lc:format type="vcard"
contenttype="application/xhtml+xml">
      <lc:item>
        <div class='vcard'>
          <span class='fn n'>
            <span class='given-name'>John</span>
            <span class='family-name'>Doe</span>
          </span>
          <div class='adr'>
            <span class='type'>work</span> address:
            <span class='street-address'>1 Microsoft Way</span>,
            <span class='locality'>Redmond</span>,
            <span class='region'>WA</span>
            <span class='postal-code'> 98052</span>
          </div>
          <div class='tel'>
            <span class='type'>work</span>
            <abbr class='type' title='voice'> phone: </abbr>
            <span class='value'>+1-978-555-1212</span>
          </div>
        </div>
      </lc:item>
      <lc:item>
        <div class='vcard'>
          <span class='fn n'>
            <span class='given-name'>George</span>
            <span class='family-name'>Doe</span>
          </span>
          <div class='adr'>
            <span class='type'>work</span> address:
            <span class='street-address'>1 Microsoft Way</span>,
            <span class='locality'>Redmond</span>,
            <span class='region'>WA</span>
            <span class='postal-code'> 98052</span>
          </div>
          <div class='tel'>
            <span class='type'>work</span>
            <abbr class='type' title='voice'> phone: </abbr>
            <span class='value'>+1-978-555-1212</span>
          </div>
        </div>
      </lc:item>
    </lc:format>
  </lc:data>
  <lc:feeds>
    <lc:feed type="RSS"
ref="http://localhost/FriendsFeed.ashx" description="My
Friends" authtype="none">
      <lc:feeditems type="vcard"
contenttype="application/xhtml+xml"
xpath="/rss/channel/item/description">
        <lc:feeditem
id="http://server/SIS/contact.vcf?puid=1688852012477191&
;roid=4EB2576478DA9846A06EFCC12FFC0185"/>
        <lc:feeditem
id="http://server/SIS/contact.vcf?puid=1688852012477191&
;roid=0B69B846ED7E2241AE4F6773EA749183"/>
      </lc:feeditems>
    </lc:feed>
  </lc:feeds>
  <lc:presentations>
    <lc:format contenttype="text/html">
      <table>
        <tr>
```

```
            <th>Fullname</th>
            <th>Street Address</th>
            <th>City</th>
            <th>State</th>
            <th>Zip</th>
            <th>Phone</th>
          </tr>
          <tr>
            <td>John Doe</td>
            <td>1 Microsoft Way </td>
            <td>Redmond</td>
            <td>WA</td>
            <td>+1-425-555-1212</td>
          </tr>
          <tr>
            <td>George Doe</td>
            <td>1 Microsoft Way </td>
            <td>Redmond</td>
            <td>WA</td>
            <td>+1-425-555-1212</td>
          </tr>
        </table>
      </lc:format>
    </lc:presentations>
</liveclipboard>
```

In the same or other implementations, a clipboard data or destination data representation might also include other elements, including other data 395. As just one example, a representation might include other data associated with providing more information about other schemas that might be used in the clipboard data or destination data representation. For example, information in a "data" element or a "feed" element, or the like, might be represented using one or more particular schemas, and the particular schema or schemas might be described using a schema definition format like the XSD (XML Schema Definition) format, or one or more of a variety of other schema definition formats. In some examples, schema definitions might be included using a top-level element—one named "schemas" perhaps—that might include child elements—each perhaps named "schema"—that contain information defining the schemas. Such schema information might be referenced using other parts of the clipboard data or destination data representation, including the "format" element, the "feeditem" element, and the like.

As just one specific example, a clipboard data or destination data representation that includes a schema definition associated with a contact might be represented as follows, where the "schemaid" attribute in the "format" element references the "schema" element with the "id" attribute that has a value of "1":

```
<?xml version="1.0" encoding="utf-8" ?>
<lc:liveclipboard version="0.93"
xmlns:lc="http://www.microsoft.com/schemas/liveclipboard">
  <lc:data>
    <lc:format type="text/xml" schemaid="1">
      <lc:item>
        <URI>http://www.microsoft.com/contacts/abcde</URI>
        <Name>John Doe</Name>
        <Address>1 Microsoft Way, Redmond, WA 98052</Address>
        <PhoneNumber>425-555-1212</PhoneNumber>
      </lc:item>
    </lc:format>
  </lc:data>
  <lc:schemas>
    <lc:schema id="1"
type="http://www.w3.org/2001/XMLSchema">
      <xs:schema xmlns:xs="http://www.w3.org/2001/XMLSchema">
        <xs:complexType name="SimpleContact">
          <xs:sequence>
            <xs:element name="URI" minOccurs="1" maxOccurs="1"
type="xs:anyURI"/>
            <xs:element minOccurs="1" maxOccurs="1" name="Name"
type="xs:string"/>
            <xs:element minOccurs="0" maxOccurs="1"
name="Address" type="xs:string"/>
            <xs:element minOccurs="0" name="PhoneNumber"
type="xs:string"/>
          </xs:sequence>
        </xs:complexType>
      </xs:schema>
    </lc:schema>
  </lc:schemas>
</lc:liveclipboard>
```

Example Computing Environment

Figure 4:
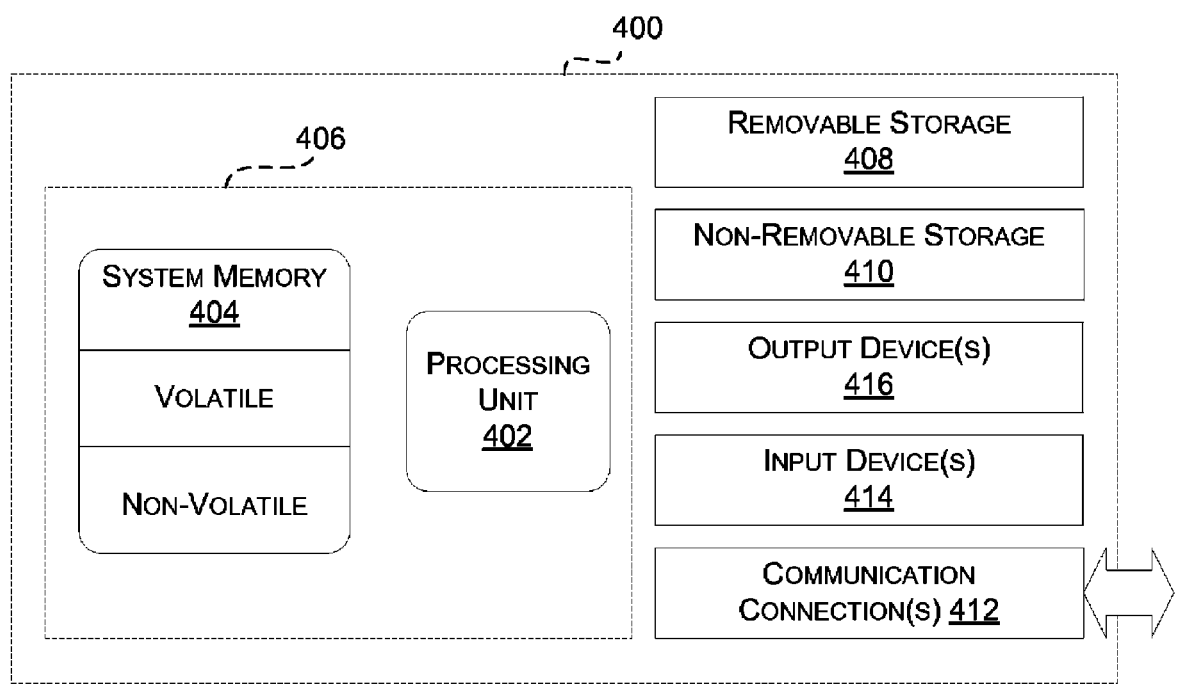
FIG. 4 illustrates an exemplary computing environment in which the various technologies described herein may be implemented.

Turning now to FIG. 4, this figure and the related description are intended to provide a brief and general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 400 illustrated in FIG. 4.

Generally, program modules include routines, programs, objects, components, user interfaces, data structures, and so on, that perform particular tasks, display particular information, or implement particular abstract data types. Operations performed by the program modules have been described previously with the aid of one or more block diagrams and operational flowcharts.

Those skilled in the art can implement the description, block diagrams, and operational flows in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The computing device 400 illustrated in FIG. 4, in its most basic configuration, includes at least one processing unit 402 and memory 404. In some implementations, the computing device 400 may be associated with or include, for example, some or all of the elements described with reference to FIG. 2, such as the source application 210, the destination application 220, the adapter application 230, and/or the clipboard 240. In some implementations, the processing unit 402 may be a general purpose central processing unit (CPU), as exists, for example, on a variety of computers, including desktop and laptop computers. Depending on the exact configuration and type of computing device, the memory 404 may be volatile (such as RAM), non-volatile (such as ROM, flash memory, etc.), or some combination of the two. This most basic configuration is illustrated in FIG. 4 by dashed line 406. Additionally, the computing device 400 may also have additional features and functionality. For example, the computing device 400 may also include additional storage (removable and/or non-removable) including, but not limited to, magnetic or optical disks or tape. Such additional storage is illustrated in FIG. 4 by the removable storage 408 and the non-removable storage 410.

The computing device 400 may also contain one or more communications connection(s) 412 that allow the computing device 400 to communicate with other devices and services. For example, the computing device might have one or more connections to a variety of communication means or computing devices. The computing device 400 may also have one or more input device(s) 414 such as an image input devices like cameras or scanners, keyboards, mice, pens, voice input devices including microphone arrays, touch input devices, and so on. One or more output device(s) 416 such as a display, speakers, printer, and so on, may also be included in the computing device 400.

Those skilled in the art will appreciate that the technologies described herein may be practiced with computing devices other than the computing device 400 illustrated in FIG. 4. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like. Each of these computing devices may be described, at some level of detail, by the system of FIG. 4, or may be described differently.

The technologies described herein may also be implemented in distributed computing environments where operations are performed by remote processing devices that are linked through a communications network. In a distributed computing environment, program modules may be located in both local and remote devices.

While described herein as being implemented in software, it will further be appreciated that the technologies described herein may alternatively be implemented all or in part as hardware, firmware, or various combinations of software, hardware, and/or firmware.

Although some particular implementations of methods and systems have been illustrated in the accompanying drawings and described in the foregoing text, it will be understood that the methods and systems shown and described are not limited to the particular implementations described, but are capable of numerous rearrangements, modifications and substitutions without departing from the spirit set forth and defined by the following claims.

What is claimed is:

1. A method, comprising:
identifying one or more existing paste targets;
registering to be notified when a paste operation associated with an identified paste target is initiated;
receiving a paste notification;
generating, in response to receiving the paste notification, destination data, using an adapter application, based upon source data copied to a clipboard; and
providing the destination data to a destination application that initiated the paste operation, the source data on the clipboard not changed and not expanded or augmented on the clipboard.

2. The method of claim 1, comprising:
using the destination data to at least one of:
update a user interface associated with the destination application to display at least a portion of the destination data; or
perform data processing using at least a second portion of the destination data.

3. The method of claim 1, the source data associated with plain text, the destination data associated with a format richer than plain text.

4. The method of claim 1, comprising:
registering to be notified when a new paste target is created.

5. The method of claim 1, access to the destination data enabled through execution of the method without requiring an entity executing the method on a computer system to have elevated privileges as part of an installation of the adapter application and without requiring the entity to have elevated privileges when executing the method.

6. The method of claim 1, the destination data comprising at least one of: structured data, feed data, or presentation data.

7. The method of claim 6, the structured data comprising a structured data item and the presentation data comprising a presentation data item that corresponds to the structured data item and provides a display representation of the structured data item.

8. The method of claim 6, the feed data comprising a feed reference associated with change data that comprises changes to the structured data.

9. The method of claim 1, the identified paste target associated with an edit control, providing the destination data to the destination application comprising setting text associated with the edit control.

10. The method of claim 1, comprising identifying a data format of the source data, and the generating the destination data comprising translating from the data format of the source data to an alternative data format associated with the destination data, information expressed in the alternative data format able to be processed by the destination application.

11. The method of claim 1, the identified paste target comprising an HTML div element that includes a not visible edit control, the not visible edit control comprising one of: an HTML textarea element or an HTML input element that has a type attribute set to text.

12. The method of claim 1, comprising: enumerating one or more windows and identifying one or more possible windows as being windows that may contain one or more paste targets; and examining information associated with at least one of the one or more possible windows to identify the identified paste target.

13. The method of claim 12, respective one or more possible windows associated with a particular attribute that is associated with all of the one or more possible windows.

14. The method of claim 12, comprising using an accessibility interface to obtain the information.

15. The method of claim 12, the at least one of the one or more possible windows comprising a web browser control, the information comprising a representation of content displayed by the web browser control.

16. A system, comprising:
one or more processors;
a memory operatively coupled to at least one of the one or more processors;
a registration module configured to:
identify one or more existing paste targets; and
register to be notified when a paste operation associated with an identified paste target is initiated;
a converter module configured to:
generate destination data based upon source data retrieved from a clipboard, the source data not changed and not expanded or augmented on the clipboard; and
an input/output module configured to:
receive a paste notification when the paste operation is initiated; and provide the destination data to a destination application that initiated the paste operation.

17. The system of claim 16, the source data associated with plain text, the destination data associated with a format richer than plain text.

18. The system of claim 16, the generating the destination data comprising translating from a data format of the source data to an alternative data format associated with the destination data, information expressed in the alternative data format able to be processed by the destination application.

19. The system of claim 16, the destination data comprising at least one of: structured data, feed data, and presentation data.

20. One or more computer-readable storage devices containing executable code for performing a method comprising:
- identifying one or more existing paste targets;
- registering to be notified when a paste operation associated with an identified paste target is initiated;
- receiving a paste notification;
- generating, in response to receiving the paste notification, destination data, using an adapter application, based upon source data copied to a clipboard; and
- providing the destination data to a destination application that initiated the paste operation, the source data not changed and not expanded or augmented on the clipboard.

* * * * *